(12) United States Patent
Werner et al.

(10) Patent No.: US 10,389,829 B2
(45) Date of Patent: Aug. 20, 2019

(54) METHOD OF PROVIDING DIGITAL CONTENT FOR USERS OF PHYSICAL ITEMS

(71) Applicant: adidas AG, Herzogenaurach (DE)

(72) Inventors: Jon H. Werner, Austin, TX (US); Christian DiBenedetto, North Plains, OR (US); Amy Jones Vaterlaus, Portland, OR (US); Stephen M. Vincent, Portland, OR (US)

(73) Assignee: adidas AG, Herzogenaurach (DE)

(*) Notice: Subject to any disclaimer, the term of this patent is extended or adjusted under 35 U.S.C. 154(b) by 0 days.

(21) Appl. No.: 16/163,351

(22) Filed: Oct. 17, 2018

(65) Prior Publication Data

US 2019/0141150 A1    May 9, 2019

Related U.S. Application Data

(63) Continuation of application No. 15/331,496, filed on Oct. 21, 2016, now Pat. No. 10,244,064, which is a
(Continued)

(51) Int. Cl.
*G06F 17/00* (2019.01)
*H04L 29/08* (2006.01)
(Continued)

(52) U.S. Cl.
CPC .......... *H04L 67/24* (2013.01); *G06F 16/2291* (2019.01); *G06F 16/235* (2019.01);
(Continued)

(58) Field of Classification Search
CPC .. G06Q 10/087; G06Q 20/203; G06Q 20/208; G06Q 30/0623; H04B 5/0031;
(Continued)

(56) References Cited

U.S. PATENT DOCUMENTS

| 6,385,586 B1 | 5/2002 | Dietz |
| 7,360,688 B1 | 4/2008 | Harris |

(Continued)

FOREIGN PATENT DOCUMENTS

| EP | 2431954 | 3/2012 |
| JP | 2003058664 | 2/2003 |

(Continued)

OTHER PUBLICATIONS

Japanese Application No. 2014-020093, Office Action dated Dec. 19, 2017, 6 pages (3 pages of English translation and 3 pages of original document).
(Continued)

*Primary Examiner* — Thien M Le
(74) *Attorney, Agent, or Firm* — Sterne, Kessler, Goldstein & Fox P.L.L.C.

(57) ABSTRACT

Systems, apparatuses, and methods are provided for enhancing users' overall experiences with physical items by supplementing their physical experiences with digital experiences. According to an embodiment, a user uses an electronic device to scan a smart tag associated with an item to obtain an item identifier of the item. The electronic device sends the item identifier to a server, which selects digital content related to the item and sends the selected digital content to the user's electronic device for display.

23 Claims, 26 Drawing Sheets

Related U.S. Application Data continuation of application No. 14/714,888, filed on May 18, 2015, now Pat. No. 9,584,609, which is a continuation of application No. 13/765,678, filed on Feb. 12, 2013, now Pat. No. 9,069,770.

(51) Int. Cl.

| | | |
|---|---|---|
| *G06F 16/22* | (2019.01) | |
| *H04W 4/80* | (2018.01) | |
| *G06F 16/248* | (2019.01) | |
| *G06F 16/23* | (2019.01) | |
| *G06F 16/40* | (2019.01) | |
| *G06Q 10/08* | (2012.01) | |
| *H04B 5/00* | (2006.01) | |
| *H04L 29/06* | (2006.01) | |
| *H04W 4/02* | (2018.01) | |
| *G06Q 20/20* | (2012.01) | |
| *G06Q 30/06* | (2012.01) | |
| *G06F 16/2457* | (2019.01) | |

(52) U.S. Cl.
CPC ...... *G06F 16/248* (2019.01); *G06F 16/24575* (2019.01); *G06F 16/40* (2019.01); *G06Q 10/087* (2013.01); *G06Q 20/203* (2013.01); *G06Q 20/208* (2013.01); *G06Q 30/0623* (2013.01); *H04B 5/0031* (2013.01); *H04B 5/0062* (2013.01); *H04L 67/18* (2013.01); *H04L 67/306* (2013.01); *H04L 67/42* (2013.01); *H04W 4/02* (2013.01); *H04W 4/80* (2018.02)

(58) Field of Classification Search
CPC ....... H04B 5/0062; H04L 67/18; H04L 67/24; H04L 67/306; H04L 67/42; H04W 4/02; H04W 4/80; H04W 4/008; G06F 16/2291; G06F 16/235; G06F 16/24575; G06F 16/248; G06F 16/40; G06F 17/30017; G06F 17/30342; G06F 17/30365; G06F 17/30528; G06F 17/30554
See application file for complete search history.

(56) References Cited

U.S. PATENT DOCUMENTS

| | | | |
|---|---|---|---|
| 7,739,150 B2 | 6/2010 | Bryant et al. | |
| 8,221,290 B2* | 7/2012 | Vincent | A63B 24/0021 482/8 |
| 8,228,196 B1 | 7/2012 | Thornton | |
| 8,229,354 B2 | 7/2012 | Sklovsky et al. | |
| 8,239,276 B2 | 8/2012 | Lin et al. | |
| 8,538,824 B1 | 9/2013 | McKay et al. | |
| 8,702,430 B2* | 4/2014 | Dibenedetto | G16H 40/67 434/247 |
| 8,768,775 B1 | 7/2014 | Roper et al. | |
| 9,069,770 B2 | 6/2015 | Werner et al. | |
| 9,141,087 B2* | 9/2015 | Brown | G04F 10/00 |
| 9,500,464 B2* | 11/2016 | Coza | G01B 7/003 |
| 9,737,261 B2* | 8/2017 | Coza | A61B 5/6804 |
| 9,940,682 B2* | 4/2018 | Hoffman | A63B 24/0059 |
| 9,984,549 B2* | 5/2018 | Poisner | A63F 13/46 |
| 2001/0016878 A1 | 8/2001 | Yamanaka | |
| 2002/0076217 A1 | 6/2002 | Rodriguez et al. | |
| 2003/0014267 A1 | 1/2003 | Culp | |
| 2003/0095032 A1 | 5/2003 | Hoshino et al. | |
| 2004/0088231 A1 | 5/2004 | Davis, Jr. | |
| 2006/0089160 A1 | 4/2006 | Othmer | |
| 2006/0143645 A1 | 6/2006 | Vock et al. | |
| 2007/0016479 A1 | 1/2007 | Lauper | |
| 2007/0192872 A1 | 8/2007 | Rhoads et al. | |
| 2007/0247306 A1* | 10/2007 | Case, Jr. | A43B 3/0005 340/539.11 |
| 2008/0215475 A1 | 9/2008 | Ramer et al. | |
| 2009/0083808 A1 | 3/2009 | Morrison | |
| 2009/0170483 A1 | 7/2009 | Barnett et al. | |
| 2009/0219132 A1 | 9/2009 | Maytal et al. | |
| 2009/0307013 A1 | 12/2009 | Altounian et al. | |
| 2009/0322493 A1 | 12/2009 | Kumagai et al. | |
| 2009/0325483 A1 | 12/2009 | May | |
| 2010/0082444 A1 | 4/2010 | Lin et al. | |
| 2010/0082445 A1 | 4/2010 | Hodge et al. | |
| 2010/0082447 A1 | 4/2010 | Lin et al. | |
| 2010/0082455 A1 | 4/2010 | Rosenblatt et al. | |
| 2010/0082485 A1 | 4/2010 | Lin et al. | |
| 2010/0082490 A1 | 4/2010 | Rosenblatt et al. | |
| 2010/0151996 A1 | 6/2010 | Alten et al. | |
| 2011/0177799 A1 | 7/2011 | Ramer et al. | |
| 2011/0221568 A1 | 9/2011 | Giobbi | |
| 2011/0264527 A1 | 10/2011 | Fitzpatrick et al. | |
| 2011/0276385 A1 | 11/2011 | Keller | |
| 2012/0029990 A1 | 2/2012 | Fisher | |
| 2012/0083705 A1 | 4/2012 | Yuen et al. | |
| 2012/0085829 A1 | 4/2012 | Ziegler | |
| 2012/0173373 A1 | 7/2012 | Soroca et al. | |
| 2012/0181330 A1 | 7/2012 | Kim | |
| 2012/0233076 A1 | 9/2012 | Sutcliffe et al. | |
| 2012/0241516 A1 | 9/2012 | Zuleeg | |
| 2012/0246030 A1 | 9/2012 | Ikeda | |
| 2012/0246581 A1 | 9/2012 | Engestrom et al. | |
| 2012/0253484 A1 | 10/2012 | Burich et al. | |
| 2012/0280790 A1 | 11/2012 | Gerhardt et al. | |
| 2013/0040561 A1 | 2/2013 | Conde e Silva et al. | |
| 2013/0059534 A1 | 3/2013 | Sobalbarro et al. | |
| 2013/0132292 A1 | 5/2013 | Lamb et al. | |
| 2013/0238471 A1 | 9/2013 | Maraz et al. | |
| 2014/0045433 A1 | 2/2014 | Kim | |
| 2014/0176307 A1 | 6/2014 | Forster | |
| 2014/0181100 A1 | 6/2014 | Ramer et al. | |
| 2014/0201088 A1 | 7/2014 | Pothuri | |
| 2014/0263677 A1 | 9/2014 | Divringi et al. | |
| 2014/0304058 A1 | 10/2014 | Krig et al. | |
| 2015/0324831 A1 | 11/2015 | Barua et al. | |
| 2015/0332212 A1 | 11/2015 | Werner et al. | |
| 2016/0373891 A1 | 12/2016 | Ramer et al. | |
| 2018/0013815 A1 | 1/2018 | Gold | |

FOREIGN PATENT DOCUMENTS

| | | |
|---|---|---|
| JP | 2008065363 | 3/2008 |
| JP | 2009198286 | 9/2009 |
| JP | 2010238257 | 10/2010 |

OTHER PUBLICATIONS

U.S. Appl. No. 15/331,558, Notice of Allowance dated Oct. 13, 2017, 10 pages.
U.S. Appl. No. 15/331,588, Non-Final Office Action dated Apr. 14, 2017, 17 pages.
Consumers—FAQ, retrieved from the internet: http://selinko.com/ [retrieved on Feb. 7, 2013], 1 page.
I Am a Designer Brand, retrieved from the internet: http://selinko.com/ [retrieved on Feb. 7, 2013], 1 page.
Press, retrieved from the internet: http://selinko.com/ [retrieved on Feb. 7, 2013], 1 page.
Selinko, retrieved from the internet: http://selinko.com/ [retrieved on Feb. 7, 2013], 1 page.
Services—An Innovative Experience, retrieved from the Internet: http://selinko.com/ [retrieved on Feb. 7, 2013], 1 page.
Technology—How Does It Work?, retrieved from the internet: http://selinko.com/ [retrieved on Feb. 7, 2013], 1 page.
Technology—Which NFC Chip for Your Sector?, retrieved from the internet: http://selinko.com/ [retrieved on Feb. 7, 2013], 1 page.
The Selinko Mobile Application, retrieved from the internet: http://selinko.com/ [retrieved on Feb. 7, 2013], 1 page.
U.S. Appl. No. 13/765,678, Non-Final Office Action dated Jul. 9, 2014, 20 pages.

(56) References Cited

OTHER PUBLICATIONS

U.S. Appl. No. 13/765,678, Notice of Allowance dated Jan. 9, 2015, 12 pages.
U.S. Appl. No. 13/765,678, Notice of Allowance dated Feb. 18, 2015, 7 pages.
U.S. Appl. No. 14/714,888, "Non-Final Office Action", dated Mar. 29, 2016, 6 pages.
U.S. Appl. No. 14/714,888, "Notice of Allowance", dated Aug. 22, 2016, 21 pages.
U.S. Appl. No. 14/714,931, "Non-Final Office Action", dated Mar. 30, 2016, 8 pages.
U.S. Appl. No. 14/714,931, "Notice of Allowance", dated Aug. 31, 2016, 11 pages.
European Patent Application No. 14153975.9, European Search Report dated Apr. 7, 2014, 5 pages.

\* cited by examiner

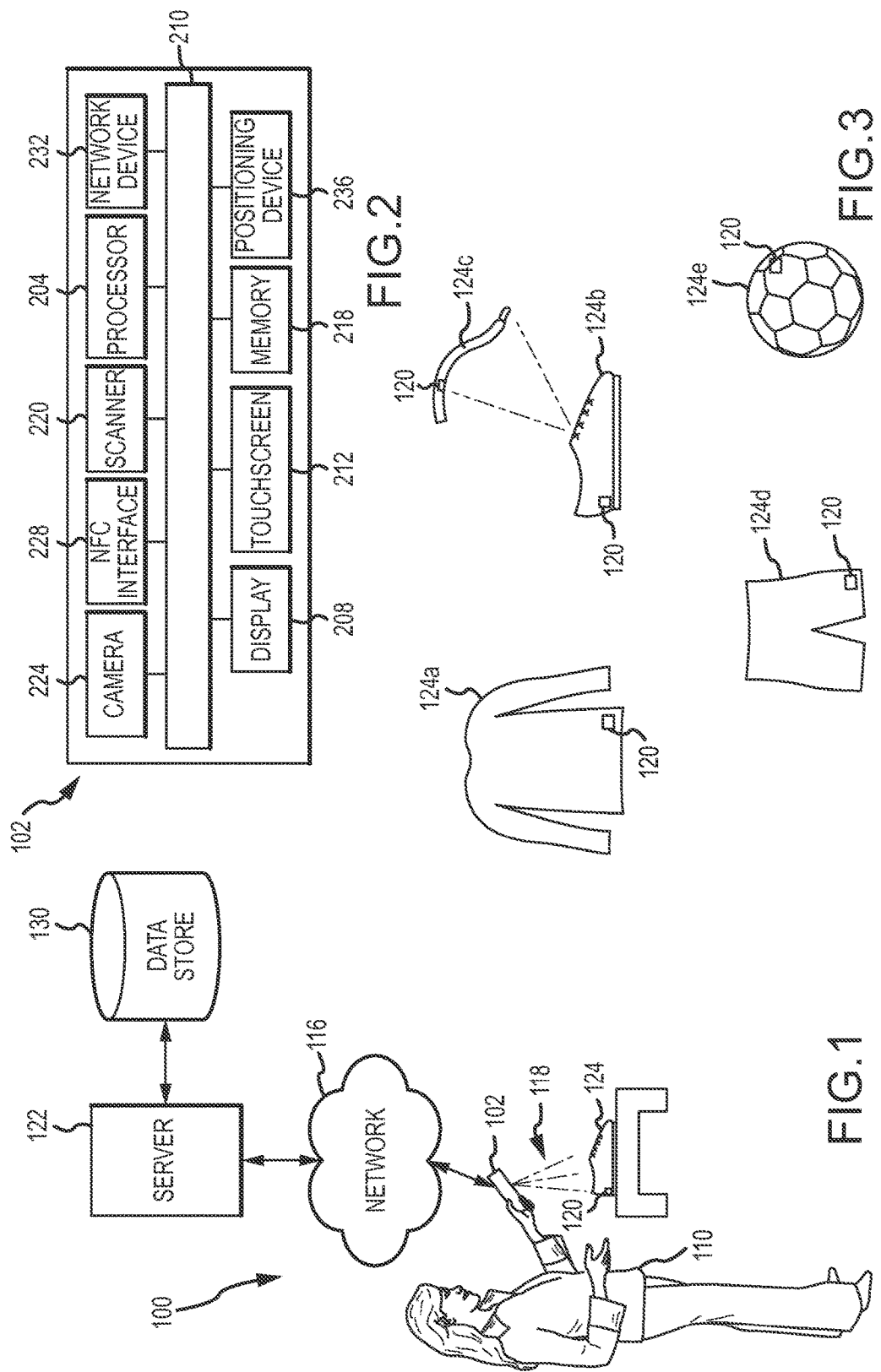

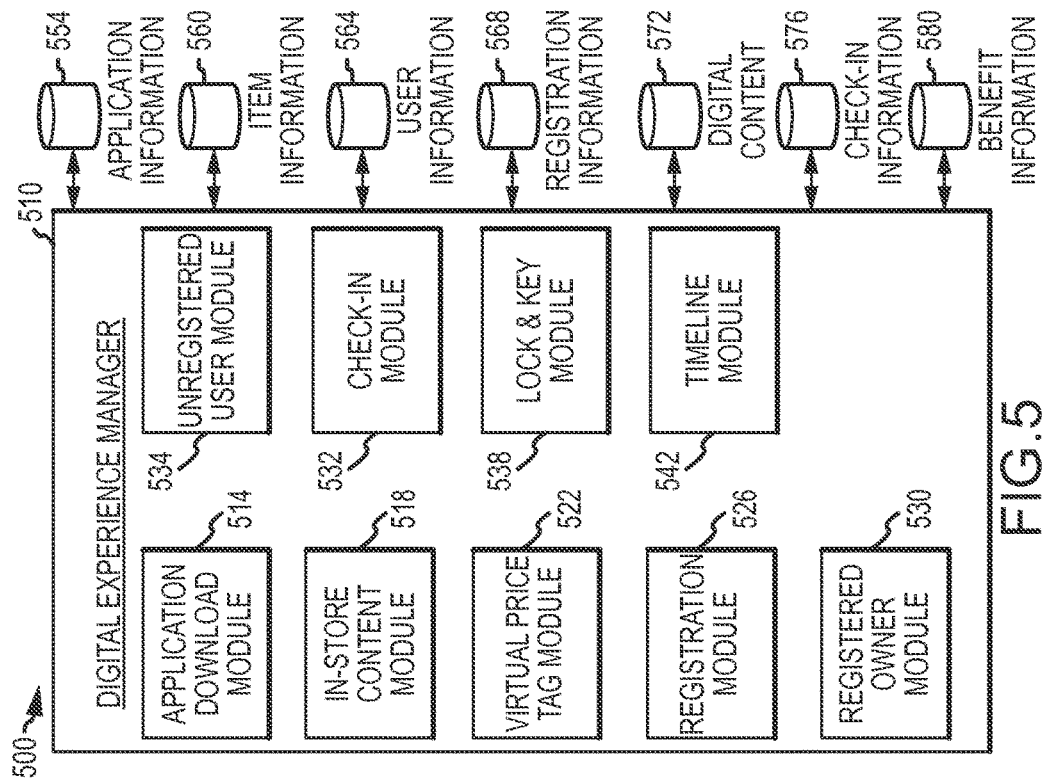
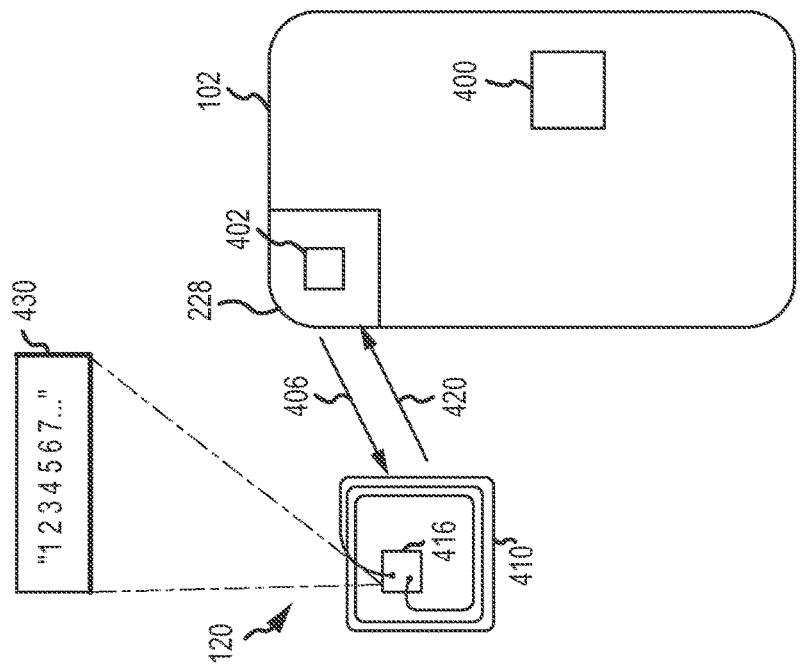

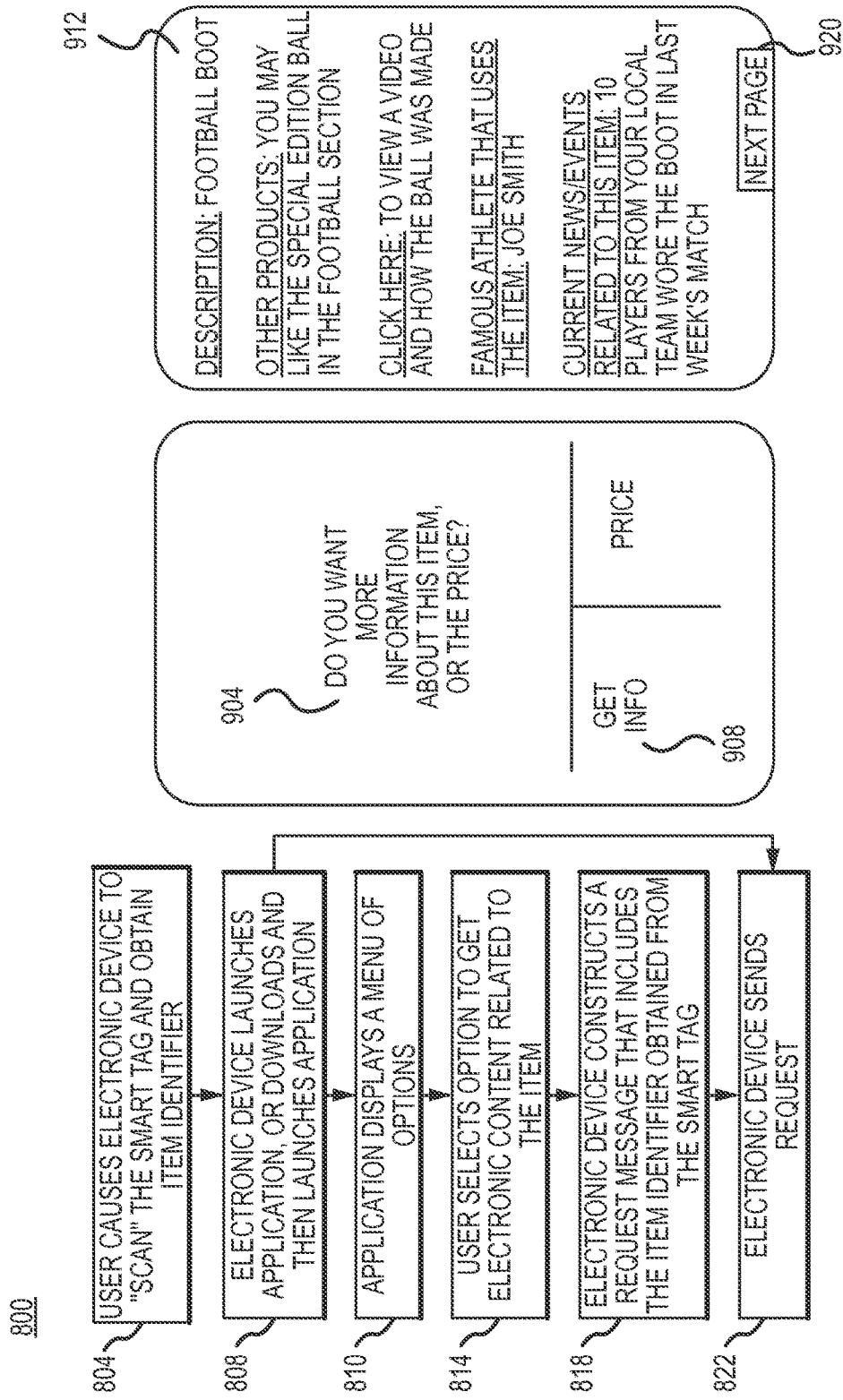

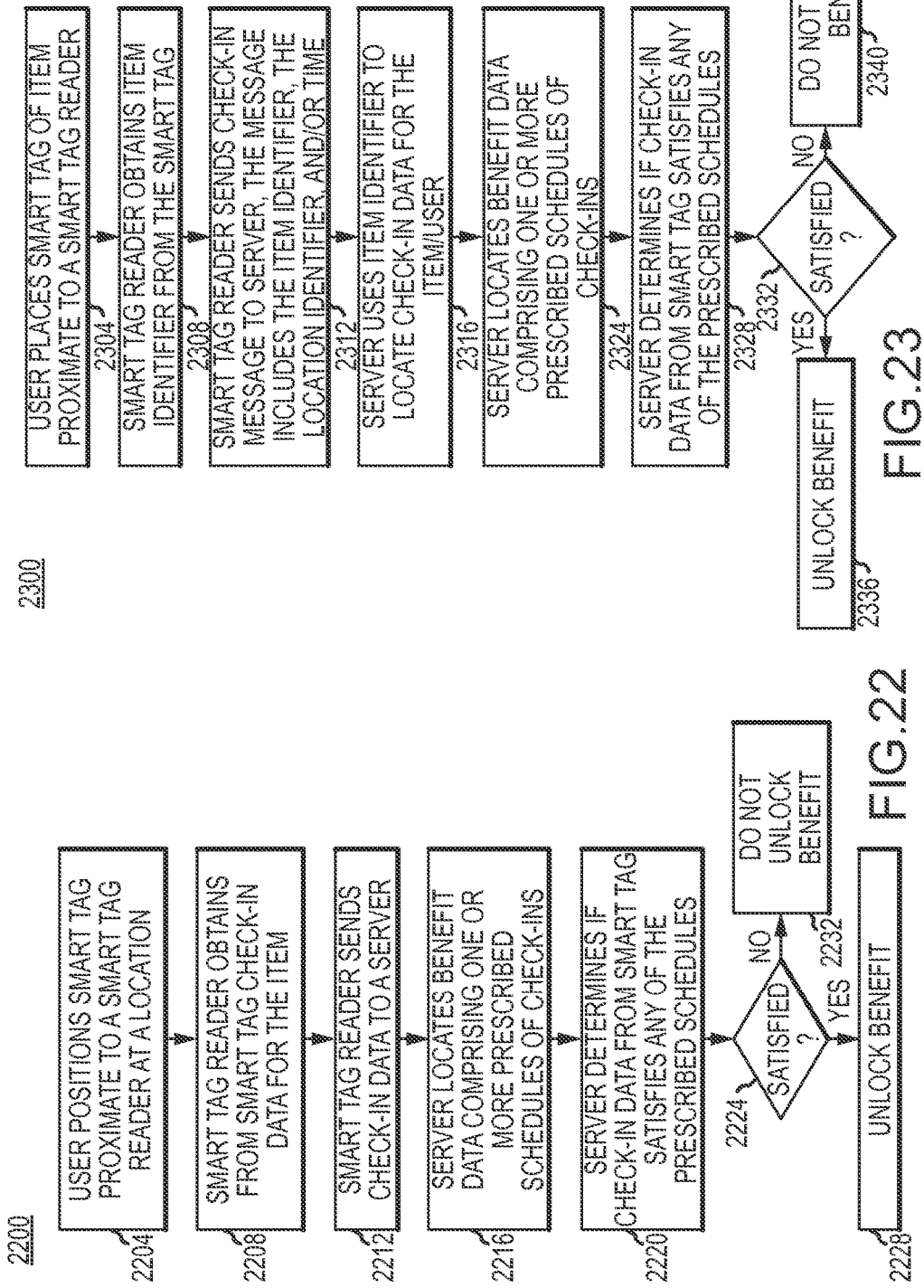

METHOD OF PROVIDING DIGITAL CONTENT FOR USERS OF PHYSICAL ITEMS

FIELD OF THE INVENTION

Embodiments of the present invention relate to enhancing users' overall experiences with physical items by supplementing their physical experiences with digital experiences, and, in particular enabling users to scan smart tags associated with physical items to obtain related digital content.

BACKGROUND

Historically, companies that produced physical items distinguished themselves by making superior products and offering those products at competitive prices. This is still true. However, the growing ubiquity of mobile computing devices is driving consumer demand for high-quality digital experiences and blurring the lines between physical and digital experiences. Accordingly, in addition to cost effectively building high-quality products, today's companies must build meaningful digital experiences around their physical products to distinguish themselves and to engage potential consumers.

While today virtually any product can be equipped with electronic circuitry having more or less processing and communication capacities, there are physical, regulatory and economic boundary conditions, which must be observed. For example a small and lightweight product cannot be equipped with large and heavy electronic circuitry. On the other hand, in order to have a product participate in wireless networks, e.g. to monitor and control the product, there must be a minimum of processing, transmit and battery power. Another aspect concerns regulations regarding available frequency spectrums and transmit powers, which must be observed by products. Thus, a product cannot arbitrarily be equipped with a radio module. Finally, complex electronics makes a product more expensive. Thus, there is a tradeoff between added "intelligence" and the price which a potential consumer is willing to pay.

BRIEF SUMMARY

Systems, apparatuses, and methods are provided for enhancing users' overall experiences with physical items by supplementing their physical experiences with digital experiences. According to an embodiment, a user uses an electronic device to scan a smart tag associated with an item to obtain an item identifier of the item. The electronic device sends the item identifier to a server, which selects digital content related to the item and sends the selected digital content to the user's electronic device for display.

According an embodiment, a method is provided for transmitting digital content related to an item to an electronic device, the item associated with a smart tag encoded with an item identifier that identifies the item, the smart tag configured to transmit the item identifier to the electronic device when the electronic device is positioned proximate to the smart tag. The method includes: receiving, at a server from the electronic device, a request to provide digital content related to the item, the request including the item identifier transmitted from the smart tag to the electronic device upon positioning the electronic device proximate to the smart tag; searching, by the server, a database having digital content to identify digital content associated with the item identifier and related to the item; selecting, by the server, a subset of the identified digital content to transmit to the electronic device; and transmitting, from the server to the electronic device, the subset of the identified digital content.

According to another embodiment, a method is provided for transmitting to a user a virtual price tag for an item being offered for sale, the item associated with a smart tag encoded with an item identifier that identifies the item, the smart tag configured to transmit the item identifier to an electronic device of the user when the electronic device is positioned proximate to the smart tag. The method includes: receiving, at a server from the electronic device of the user, a request to provide the virtual price tag for the item, the request including the item identifier transmitted from the smart tag to the electronic device upon the user positioning the electronic device proximate to the smart tag; searching, by the server, a database to identify a price of the item if the item were purchased by the user; and transmitting, from the server to the electronic device of the user, the price of the item, the mobile device displaying to the user the price.

According to another embodiment, a method is provided for registering an item to a user account of a user, the item associated with a smart tag encoded with an item identifier that identifies the item. The method includes: receiving, at a server from a device, a purchase-indication message for the item, the purchase-indication message indicating that the item has been purchased and is no longer being offered for sale, the purchase-indication message including the item identifier that identifies the item; locating, by the server, in a database of item data a subset of item data associated with the item identifier and related to the item; setting, by the server, a registration flag in the subset of item data, the registration flag, when processed by the server, causes the server to prompt the user to register the item to the user account; receiving, at the server from an electronic device of the user, a request to provide digital content related to the item, the request including the item identifier transmitted from the smart tag to the electronic device of the user upon the user positioning the electronic device proximate to the smart tag; locating, by the server, in the database of item data the subset of item data related to the item; and responsive to processing the registration flag, prompting, by the server, the user to register the item to the user account.

According to another embodiment, a method is provided for transmitting digital content related to an item to an electronic device, the item associated with a smart tag encoded with an item identifier that identifies the item, the smart tag configured to transmit the item identifier to the electronic device when the electronic device is positioned proximate to the smart tag. The method includes: receiving, at a server from the electronic device, a request to provide digital content related to the item, the request including a user identifier of a user of the electronic device and the item identifier transmitted from the smart tag to the electronic device upon positioning the electronic device proximate to the smart tag; determining, by the server, whether the item is registered to the user, wherein at least one of the user identifier and the item identifier is used to determine whether the item is registered to the user; if the item is registered to the user, providing the electronic device with digital content designated for registered users; and if the item is not registered to the user, providing the electronic device of the user with digital content designated for non-registered users.

According to another embodiment, a method is provided for unlocking a benefit in the event an item is checked in at one or more locations, the item associated with a smart tag encoded with an item identifier that identifies the item, the smart tag configured to transmit the item identifier to a device positioned proximate to the smart tag. The method includes: receiving, at a server from a device located at a location, a check-in message indicating check-in of the item at the location, the check-in message including the item identifier that identifies the item and a location identifier that identifies the location, the item identifier transmitted from the smart tag to the device when the item is positioned proximate to the device; locating, by the server, in a database a subset of check-in data related to the item, wherein the item identifier is used to locate the subset of check-in data; reviewing, by the server, the subset of check-in data to determine whether the item has been checked in at the one or more locations; and unlocking, by the server, the benefit if the item has been checked in at the one or more locations.

According to another embodiment, a method is provided for granting a device access to information in the event an item is checked in at one or more locations, the item associated with a smart tag encoded with an item identifier that identifies the item, the smart tag configured to transmit the item identifier to a device positioned proximate to the smart tag. The method includes: receiving, at a server from the device located at a location, a check-in message indicating check-in of the item at the location, the check-in message including the item identifier that identifies the item and a location identifier that identifies the location, the item identifier transmitted from the smart tag to the device when the item is positioned proximate to the device; locating, by the server, in a database a subset of check-in data related to the item, wherein the item identifier is used to locate the subset of check-in data; reviewing, by the server, the subset of check-in data to determine whether the item has been checked in at the one or more locations; and granting, by the server, the device access to information if the item has been checked in at the one or more locations.

According to another embodiment, a method is provided for unlocking a benefit in the event an item is checked in at one or more locations according to at least one of a prescribed schedule of check-ins and a prescribed order of check-ins, the item being associated with a smart tag. The method includes: receiving, at a server from a device, check-in data transmitted from the smart tag associated with the item to the device upon the item being positioned proximate to the device, the check-in data including a location identifier and a corresponding time for one or more locations where the item has previously been checked in; and unlocking, by the server, the benefit if the check-in data obtained from the smart tag satisfies at least one of the prescribed schedule of check-ins and the prescribed order of check-ins.

According to another embodiment, a method is provided for granting a device access to information in the event an item is checked in at one or more locations according to at least one of a prescribed schedule of check-ins and a prescribed order of check-ins, the item being associated with a smart tag. The method comprises: receiving, at a server from the device, check-in data transmitted from the smart tag associated with the item to the device upon the item being positioned proximate to the device, the check-in data including a location identifier and a corresponding time for one or more locations where the item has previously been checked in; and granting, by the server, the device access to information if the check-in data obtained from the smart tag satisfies at least one of the prescribed schedule of check-ins and the prescribed order of check-ins According to another embodiment, a method is provided for creating a timeline of information related to one or more items, each of the items being associated with a smart tag encoded with an item identifier that identifies the item, the smart tag configured to transmit the item identifier to a device when the device is positioned proximate to the smart tag. The method comprises: receiving, at a server from a device, registration information related to one or more of the items, the registration information including for at least some of the items a user identifier of the user, an item identifier that identifies the item, and a date-of-acquisition, the item identifier transmitted from the smart tag to the device upon the device being positioned proximate to the smart tag; obtaining, by the server, an item description of for at least one or more of the items; generating an item timeline for the user, the item timeline listing an item description and a date-of-acquisition for at least some of the items; and displaying the item timeline in a graphical user interface.

According to another embodiment, a method is provided for creating a timeline of events associated with an item, the item being associated with a smart tag encoded with an item identifier that identifies the item, the smart tag configured to transmit the item identifier to a device when the device is positioned proximate to the smart tag. The method comprises: receiving, at a server from a device, at least one of a user identifier of a user of the item and an item identifier that identifies the item, the item identifier transmitted from the smart tag to the device upon the device being positioned proximate to the smart tag; obtaining, by the server, an item description of for the item; obtaining, by the server, a plurality of check-ins of the item; generating a timeline of events for the item, the timeline of events listing at least some of the check-ins; and displaying the timeline of events in a graphical user interface.

For a fuller understanding of the nature and advantages of embodiments of the present invention, reference should be made to the ensuing detailed description and accompanying drawings. Other aspects, objects and advantages of the invention will be apparent from the drawings and detailed description that follows. However, the scope of the invention will be fully apparent from the recitations of the claims.

BRIEF DESCRIPTION OF THE DRAWINGS

FIG. 1 illustrates a block diagram of an example environment for implementing aspects of embodiments disclosed herein.

FIG. 2 illustrates a block diagram of an example electronic device, in accordance with at least one embodiment.

FIG. 3 is a schematic diagram illustrating example smart tags associated with various example items, in accordance with at least one embodiment.

FIG. 4 is a schematic diagram illustrating an example electronic device and an example smart tag and communication there between, in accordance with at least one embodiment.

FIG. 5 is a block diagram depicting aspects of an example system, in accordance with at least one embodiment.

FIG. 8 provides a flow diagram illustrating an example process of sending a request to obtain digital content related to an item being offered for sale, in accordance with at least one embodiment.

FIGS. 9A-D are schematic diagrams of example screenshots of a menu giving a user an option to obtain more information about an item, in accordance with at least one embodiment.

FIG. 22 provides a flow diagram illustrating an example process of unlocking a benefit using check-in data stored on a smart tag, in accordance with at least one embodiment.

FIG. 23 provides a flow diagram illustrating an example process of "checking in" at a location, storing check-in data on a server, and unlocking qualifying benefits, in accordance with at least one embodiment.

DETAILED DESCRIPTION

Figure 6:
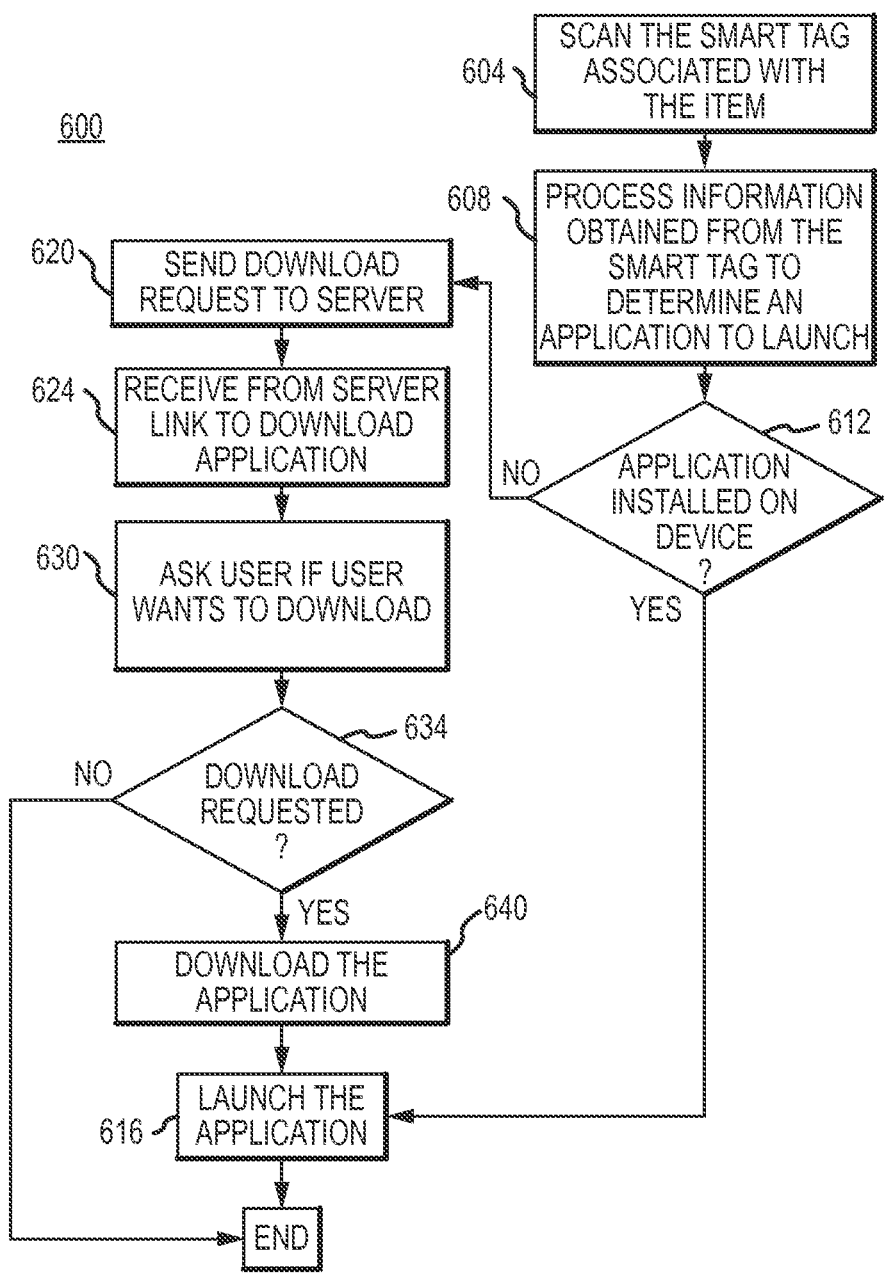
FIG. 6 illustrates an example process of determining which application to use to request and display digital content and, if the application is not already installed, download and install the application to an electronic device, according to an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details, and that variations and other aspects not explicitly disclosed herein are contemplated within the scope of the various embodiments. Furthermore, well-known features may be omitted or simplified in order not to obscure the embodiment being described.

FIG. 1 illustrates an example of an environment 100 for implementing aspects in accordance with various embodiments. As will be appreciated, although environment 100 is provided for purposes of explanation, different environments may be utilized, as appropriate, to implement various embodiments. The illustrated environment 100 includes an electronic device 102, which may include any appropriate device operable to send and receive requests, messages, or information over an appropriate network 116 and convey information back to a user 110 of the device 102. Examples of such electronic devices include mobile phones, electronic devices, mobile devices, handheld messaging devices, laptop computers, personal data assistants, electronic book readers, watches, wrist worn devices and the like.

According to embodiments, the electronic device 102 incorporates the functionality of one or more portable devices, such as a cellular telephone, a media player, a personal computer, etc. A user may use the electronic device 102 to view pictures and video, surf the web, etc., even though the electronic device 102 is portable. The electronic device 102 may allow a user to connect to and communicate through the network 116, such as the Internet or local or wide area networks. For example, the electronic device 102 may allow a user to communicate using e-mail, text messaging, instant messaging, or other forms of electronic communication.

According to embodiments, the electronic device 102 communicates with other devices using short-range wireless connections, such as Bluetooth®, radio-frequency identification (RFID) and/or near field communication (NFC). It is possible that NFC and RFID can work together in a way that an NFC-enable electronic device reads data from smart tags having RFID chips, or vice versa. As illustrated in FIG. 1, the electronic device 102 uses a short-range wireless connection 118 to communicate with a smart tag 120 attached to item 124. For example, the electronic device 102 obtains information from the smart tag 120 of the item 124, and uses the obtained information to retrieve from the network 116 digital content related to the item 124. The item 124 can be any consumer product or good purchased or otherwise acquired by the user 110. For example, the item 124 may be apparel, such as shoes, socks, shirts, pants, hats, etc. Also for example, the item 124 may athletic equipment, such as footballs, soccer balls, tennis balls and rackets, heart rate monitors, watches, etc.

FIG. 2 illustrates a block diagram of an example electronic device 102 in accordance with various embodiments. As illustrated, the device 102 is enclosed by an external casing 202 that protects the interior components from being damaged. The external casing can be made of any suitable material such as plastic, metal, etc. The electronic device 102 may include any number of tactile input controls, including switches, keys, buttons, touch sensitive buttons, etc. The device 102 also includes a display 208 which may display various images generated by the device. The display 208 may be any type of display such as a light-emitting diode (LED) based display, a Retina display, a liquid-crystal display (LCD), etc. The device 102 may include a touch screen 212 that a user can select elements of the display 208 by touching the selected elements.

The display 208 may be used to display a graphical user interface (GUI) that allows a user to interact with the device. The tactile input controls or the touchscreen may be used to navigate the GUI. For example, the icons may be selected by touching the appropriate location of the touch screen 212. When an icon is selected, the device 102 may be configured to open an application associated with that icon and display a corresponding screen. For example, when an athletic training icon is selected, the device 102 may open an athletic training program and display a training menu presenting the various tools and features available in the athletic training program. The electronic device 102 may include audio input and output elements, such as microphones that receive audio input and speakers that output sound.

The electronic device 102 may include one or more processors 204 that provide the processing capability required to execute the operating system, applications, and other functions of the device 102. The one or more processors 204 may include general and special purpose microprocessors and/or a combination thereof. The processor 204 also may include on board memory for caching purposes and may be connected to a data bus 210 so that it can provide instructions to the other devices connected to the data bus 210.

The electronic device 102 may also include storage memory 218 for storing data required for the operation of the processor 204 as well as other data required by the electronic device 102. For example, the storage memory 218 may store the firmware for the electronic device 102 usable by the one or more processors 204, such as an operating system, other programs that enable various functions of the electronic device 102, GUI functions, and/or processor functions. The storage memory 218 may also store data files such as software applications, etc.

The electronic device 102 may also include one or more network devices 232 for receiving and transmitting information over one or more communications channels. As such, the network device 232 may include one or more network interface cards (NIC) or a network controller. In some embodiments, the network device 232 may include a local area network (LAN) interface for connecting to a wired Ethernet-based network and/or a wireless LAN, such as an IEEE 802.11x wireless network (i.e., WiFi). In certain embodiments, the LAN interface may be used to receive information, such as the service set identifier (SSID), channel, and encryption key, used to connect to the LAN.

The network device 232 also may include a wide area network (WAN) interface that permits connection to the Internet via a cellular communications network. The network device 232 may also include a personal area network (PAN) interface for connecting to a PAN such as a Bluetooth® network, an IEEE 802.15.4 (ZigBee) network, or an ultra wideband (UWB) network. The network device 232 may interact with an antenna to transmit and receive radio frequency signals of the network. The network device 232 may include any number and combination of network interfaces.

The electronic device 102 may also include a positioning device 236 used to determine geographical position. The positioning device 236 may utilize the global positioning system (GPS) or a regional or site-wide positioning system that uses cell tower positioning technology or WiFi technology, for example.

According to some embodiments, the device 102 includes a scanner 220, such as a barcode scanner that may be used to obtain item identifying information from a tag or label associated with an item 124, which then may be used by applications installed on the device 102. One of ordinary skill in the art will recognize various devices and techniques for implementing the scanner 220. The device 102 may also include a camera 224. Similar to the scanner 220, the camera 224 may be used as part of the overall system to identify items 124, such as consumer products. For example, the camera 224 may be used to capture an image of a barcode or a QR-code, which then may be processed by the device 102 to extract the encoded product-identifying information. Techniques for processing a video image to extract coded information will also be known by those of ordinary skill in the art.

The device 102 further includes a near field communication (NFC) interface 228 that allows for close-range communication, and may comply with such standards as ISO/IEC 18092, ISO/IEC 14443, ISO/IEC 21481, as well as others known by those of ordinary skill in the art. The NFC interface 228 may, for example, have a range of about 2 to 4 centimeters. The close-range communication with the NFC interface 228 may take place via magnetic field induction, allowing the NFC interface 228 to communicate with smart tags that work with NFC. Smart tags include, for example, NFC tags and radio frequency identification (RFID) tags. In this way, the NFC interface 228 may be used to identify an item 124, such as a consumer product that contains a smart tag 120.

Referring now to FIG. 3, example smart tags 120 are shown being attached to, embedded in, or otherwise associated with several items 124. According to embodiments, the smarts tags 120, which are also known as 'info tags' or 'tags', have storage memory and a radio chip attached to an antenna. Smart tags, such as NFC and RFID tags are small, cheap and easily integrated into different items 124. As illustrated, a smart tag 102 is woven into, sewed to, glued to, knitted to, stuck to, or otherwise attached to the appropriate location on an item 124, such as a jersey 124a, a shoe 124b, a shoelace 124c, shorts 124d, and a football 124e. In the case of shoes, the smart tag 102 can be integrated into the tongue, midsole, outsole, heel counter, and/or any other suitable location. Further, for example, the smart tag 120 can be integrated into or attached to hangtags that are attached to or otherwise associated with the item 124. It should be appreciated that these are merely examples and that smart tags can be attached to any type of item 124 according to any manner know by those having skill in the art.

According to embodiments, the smart tags 120 are passive and do not have or require a power source. In this case, the smart tags 120 draw power from the device that reads them. For example, as illustrated in FIG. 4, a user activates an NFC application 400 on the electronic device 102. In some examples, to activate the electronic device's NFC functionality, the user activates the NFC communication in the settings section of the electronic device 102 (e.g., similar to Bluetooth® functionality). Activating the NFC communication and/or the NFC application 400 sends a signal to an NFC chip 402 inside the device 102. Electric current passes through the NFC chip 402, thereby causing a magnetic field 406 to be emitted from the NFC interface 228 of the electronic device 102. When the user positions the electronic device 102 proximate to the smart tag 120, the magnetic field 406 emitting from the NFC interface 228 inducts a current inside the smart tag 120 and thereby powers a storage memory and radio chip 416 inside the smart tag 120. For example, a coil 410 (a.k.a. antenna) of the smart tag 120 converts the magnetic field 406 into electric current, which powers the chip 416 causing it to emit radio waves 420 that transmit data from the smart tag 120. For example, the radio waves 420 emitted from the smart tag 120 interact with the magnetic field 406 emitted by the electronic device 102, and the NFC chip 402 in the electronic device 102 obtains from the radio waves 420 the data being transmitted from the chip 416. According to embodiments, the smart tag 120 can be a rivet, such as an NFC rivet. For example, the rivet can have an NFC passive IC and antenna that can be riveted to existing items, such as shoes and apparel. In some example, user could take a picture of the item with the rivet to drive specific content for that item, as described herein.

In some embodiments, the data transmitted from the storage memory and radio chip 416 include instructions that cause the electronic device 102 to perform a specific operation, such as launch a particular application or load a particular webpage. In other embodiments, the storage memory and radio chip 416 store and transmit an item identifier 430 to the electronic device 102, and an application independently running on the electronic device 102 determines how to handle the item identifier 430. In still other embodiments, the storage memory and radio chip 416 store and transmit a website address, an email address, and so forth. According to some embodiments, the smart tags are writable. For example, customized data may be written to a blank smart tag or to existing data. Further, according to embodiments, the smart tags can be locked or encrypted so that the data on the tags cannot be manipulated.

Referring again to FIG. 1, the network 116 may include any appropriate network, including an intranet, the Internet, a cellular network, a wireless local area network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections and combinations thereof.

The illustrated environment 100 includes at least one server 122 and a data store 130. It should be understood that there may be several servers (e.g., application servers, web servers, etc.), layers, or other elements, processes, or components, that may be chained or otherwise configured, and that may interact to perform tasks, such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment.

According to embodiments, the server 122 is an application server that includes any appropriate hardware and software for integrating with the data store as needed to execute aspects of one or more applications for the client device 102, and may even handle a majority of the data access and business logic for an application. For example, the server 122 can be an application server that provides access control services in cooperation with the data store 130, and that is able to generate content such as text, graphics, audio, and/or video to be transferred to the user, which may be served to the user by a native application on the client device 102 by a web server in the form of HTML, XML, or another appropriate structured language.

The data store 130 is operable, through logic associated therewith, to receive instructions from the server 122, and obtain, update, or otherwise process data in response thereto. In one example, a user might submit a request for digital content related to a particular item 124. In this case, the data store 130 might access stored user information to verify the identity of the user, and it may access stored information to obtain information about the item 124. The information then may be displayed to the user. The user may review the results via a native application on the user device 102 or via a webpage that the user is able to view via a browser on the user device 102.

According to embodiments, any time a mobile browser on an electronic device 102, such as a mobile device, makes a request for content, the browser can evaluate information provided by the native device. For example, mobile browsers and other applications (such as applications described herein for communicating with the digital content manager 510) are capable of providing programming interfaces into the native mobile device. According to embodiments, information stored locally on electronic devices, such as browser cookies and cache, is used to select content to be provided to users. For example, the information stored locally on a user's electronic device may reflect the user's tap behavior. This information can be interrogated by the web browser, and the result of the interrogation is fetching predetermine web address URLs and/or rendering predetermined HTML code. For instance, when a user taps on an item with their electronic device and the device provides no local information (e.g., this could be a first tap), then electronic device's browser fetches a default mobile website. This website will stored on the electronic device to be used for future taps.

The next item the user taps an item, the stored website is rendered as a splash page to present something locally to the mobile browser and the user while data is fetched from the network. This will give immediate feedback to the consumer upon taping an item and thus improve the customer's experience. Additionally, treasure hunts and other campaigns could be implemented using local data to store on the electronic device each location achieved. Thus, in the case of areas with poor network connectivity, the user would be able to check-in to locations because the information would be stored locally on the native device. In some cases, when the network connectivity is restored, the check-in data can later be sent to a remote server.

The server 122 may include an operating system that provides executable program instructions for the general administration and operation of the server, and it may further include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the environment 100 in FIG. 1 should be taken as being illustrative in nature, and not limiting to the scope of the disclosure.

The environment 100 of FIG. 1 may include additional components and/or other arrangements, as illustrated in system 500 of FIG. 5. In this example, the system 500 includes a digital experience manager 510 that responds to requests from electronic devices to provide the electronic devices with digital content related to particular items 124. In some embodiments, the digital experience manager 510 is an application executed on the server 122. The digital experience manager 510 can be launched, viewed, and/or controlled using an electronic device 102, such as via a web browser window.

As shown in FIG. 1, the user 110, for example, uses the electronic device 102 to scan the smart tag 120 of the item 124 and send a request to the digital experience manager 510 to provide the electronic device 102 with digital content related to the item 124. According to the illustrated embodiment, the digital experience manager 510 includes an application download module 514, an in-store content module 518, a virtual price tag module 522, a registration module 526, a registered owner module 530, an unregistered user module 534, a check-in module 532, a lock & key module 538, and a timeline module 542. The digital experience manager 510 reads and/or writes data to an application data store 554, an item information data store 560, a user information data store 564, a registration data store 568, a digital content data store 572, a check-in information data store 576, and a benefit information data store 580. The data stores 554, 560, 564, 568, 572, 576, and 580 may be implemented as part of the digital experience manager 510 or separately from the digital experience manager 510 depending on the embodiment of the invention.

Application information 554 may include, for example, applications that are available for download to an electronic device of a user and that will enable the user to interact with the digital experience manager 510. For example, the application information 554 may include applications that interact with the in-store content module 518 to provide users with digital content concerning items identified by the user while shopping. Also for example, the application information 554 may include applications that interact with the virtual price tag module 522 to send item prices to users' electronic devices while the users are shopping in brick-and-mortar stores. It should be appreciated that these are just illustrative examples of applications that may be in the application information 554, and that other applications may be provided. Such applications may interact with the registration module 526, the registered owner and unregistered user modules 530, 534, the lock & key module 538, the timeline module 542, among others. It should be appreciated that one or more applications can be provided for interacting with some or all of the modules 514, 518, 522, 526, 530, 534, 532, 538, and 542.

Item information 560 may include, for example, a table of item identifiers and corresponding item descriptions, prices, model numbers/names, sizes, colors, links/references to related digital content in the digital content 572, identifiers of registered owners, and links/references to user accounts of registered owners in the user information 564. Item information 560 may also include information about the design, manufacture and distribution of the items. Item information 560 may also include the names, stats, and other information of athletes and athletic clubs and teams that use said items, and information about use of said items in sporting events (e.g., football was used in famous match).

User information 564 may include, for example, (1) personal information about the user, such as age, gender, income, current location information (e.g., city, region, address), phone numbers, email addresses, interests, social network memberships, favorite collegiate and profession athletic clubs and teams, and the like; (2) user purchase history identifying items 124 previously purchased by the user, the price paid for items 124, and the merchants from whom the items were purchased; (3) a history of recommendations made by the user, including the identities of the people to whom the recommendations were made, the recommended items 124, the dates of the recommendations, and whether the recommendations were converted into an actual purchase. In some example, the recommendations were made by the user via social networks and/or media, blog comments and entries, and other electronic communications. Also for example, the recommend the product, the user can "tap" the smart tag 120 of item 124 using their electronic device 102, thereby causing an application on the electronic device to recommend the item 124.

User information 564 may also include, as an additional example, (4) athletic training data, such as data generated and used by athletic training applications running on the user's electronic device. Said athletic training data may include, for example, jogging routes and times, particular exercises and indication of when the user performed those exercises, notes, fitness goals, fitness accomplishments, and physiological data, such as heart rate, calories burned, VO2 max, etc. In particular, according to some embodiments, the athletic training data (a.k.a. workout data) may include the distance run using or wearing a registered item, the number of hours of workouts, the number of the user's registered items 124 categorized as athletic apparel or equipment, the type and number of achievements, including trophies, badges, awards, certificates etc.

User information 564 may be obtained through various mechanisms. Users may expressly input and provide the user information through a website application. For example, a website or application may enable a user to create and manage a user profile or account that is incorporated into the user information data store 564. The user information may be obtained from a database of recorded historical purchases (online and offline), the user's Internet search history, user demographic information, social graph (e.g., network of friends, relatives, work associates, etc.), and the like.

Registration information 568 may indicate which items are registered to which users. For example, the registration information may include a table of item identifiers and corresponding user identifiers of the items' registered owners. It should be appreciated that the registration information may be included in the item information and/or the user information.

Digital content 572 may include, for example, text, images, video content, animated content, games, and links to websites, any of which could include information about the items 124. According to some embodiments, an entity associated with an item 124 (e.g., manufacturer, merchant, retailer, vendor, advertiser, etc.) may provide, as part of the digital content, information about the item, and brand imagery, logos, advertising content, and promotional content. For example, an entity may provide information about related products, top-selling items, newest items, items within a certain price range, items popular in specific geographic locations and markets, and information about products that complement the items 124. For example, if a user is interested in a particular basketball shoe, the entity may provide digital content about products that complement the basketball shoe, such as basketball shorts, jerseys, sweatbands, basketballs, and the like.

Check-in information 576 may include, for example, the locations where it was determined that a user used an item 124, and corresponding information, such time and exact location of use. For example, the location of use could be GPS location, address, city, state, region, and/or country. The location of use could also be the name or other identifying information of the business entity where the item was checked in, such as a restaurant, an athletic event, a venue, etc. The check-in information may include a table of item identifiers and corresponding time, location, and/or user data for the instances where the item has been checked in. It should be appreciated that the check-in information may be included in the item information 560 and/or the user information 564.

Benefit information 580 may include, for example, information about benefits available to qualifying users. For example, benefits may be services and/or digital content delivered directly to the electronic devices via text messages, email, or push message. Benefits may include immediate access to a sales person upon entering a retail store, access to an athletic event, concert, or other event, access to an express line or separate entrance at an event, and promotional offers, such as product discounts, etc. Benefits may also include access to exclusive digital content.

According to an embodiment, the application download module 514 downloads applications from the application information 554 to the electronic device 102 that enable the user 110 to use the electronic device 102 to interact with the digital experience manager 510. For example, the application download module 514 may download from the application information 554 an in-store shopping application that provides information about on-sale items and enables users to obtain and view information about products. Other example applications are discussed herein.

FIG. 6 illustrates an example process 600 of determining which application to use to request and display digital content and, if the application is not already installed, download and install the application to an electronic device, according to an embodiment. Some or all of the process 600 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory. The one or more computer systems may be, as an example, one or more computer systems in the environment 100 of FIG. 1 that collectively implement the digital experience manager 510 described above in connection with FIG. 5.

As indicated at block 604, the process 600 generally begins when someone, typically the user 110, scans a smart tag associated with an item 124, typically for sale in a store where the user 110 is shopping. At block 608, the electronic device 102 processes data received from the smart tag 120.

In some embodiments, the data from the smart tag 120, when processed by the electronic device 102, causes the electronic device 102 to execute an application that displays digital content related to the item 124. For example, processing the data received from the smart tag 120 causes the electronic device 102 to execute a web browser that loads from a web server a webpage specified in the data from the smart tag 120. In this example, the data from the smart tag 120 directs the electronic device's web browser to a particular webpage, which provides digital content related to the item. In some examples, the web browser is a standard web browser that comes preinstalled on many electronic devices. In operation, according to an illustrative example, the user 110 uses the electronic device 102 to "tap" or "scan" the smart tag 120 of an item 124, such as a shoe. The saved instructions on the smart tag 120 cause the electronic device 102 to open a web browser and go to a website with information about the item (price, name, images, text, videos, etc). In some cases, a cookie saved on the electronic device, such as in the web browser, causes the web browser to open a particular webpage, which displays different specific content, every time a smart tag 120 is scanned. According to some examples, the webpage or website displayed can be influenced by location of tap, time, day of the week, marketing campaign to be run, previous tap locations, other taps by friends.

It should be appreciated that applications, other than web browsers, can be launched, opened, and/or executed by the electronic device upon scanning a smart tag to display digital content related to the item. For example, a manufacturer or a retailer of item can make available for download to the electronic device 102 an application that enables the user 110 to view digital content about scanned items. Example screen shots of such applications are illustrated in, and corresponding description is provided with reference to, FIGS. 9A-D and 13.

In other embodiments, the data from the smart tag 120, when processed by the electronic device 102, causes the electronic device 102 to execute an application that can be used with the item 124 to enhance the user's experience with the item. For example, if the item 124 is a jogging shoe, then the application can be a jogging application that tracks the user's distance, jogging routes, heart rate, calories burned, etc. An example of such an application is miCoach® Application offered by Adidas®. Example screen shots of such applications are illustrated in, and corresponding description is provided with reference to, FIGS. 20A-E, 25, and 28.

At block 612, if the application specified by the data of the smart tag is already installed on the electronic device 102, the process 600 proceeds to block 616, where the electronic device launches, opens, switches to, or otherwise executes the application (e.g., the application could be a web browser that is already open on the device, and the data from the smart tag causes the web browser to go to a particular webpage or website). However, at block 612, if the application specified by the data from the smart tag is not already installed on the electronic device, the process 600 proceeds to block 620, where the data from the smart tag 120 causes the electronic device 102 to send a download request to the application download module 514 of the digital experience manager 510. The download request includes information obtained from the smart tag that identifies the appropriate application (e.g., the application could be provided by a retailer or manufacturer of items).

At block 624, responsive to the download request, the application download module 514 of the digital experience manager 510 sends the electronic device 102 a link to download the application. At block 630, the electronic device 102 asks the user 110 to confirm whether the user 110 desires to download the application. It should be appreciated that, at block 630, the application is automatically downloaded, without requesting approval from the user. At decision block 634, the process 600 ends if the user does not confirm. However, if the user confirms, the application is downloaded to the electronic device at block 640, and the electronic device 102 launches the application at block 616.

Figure 7:
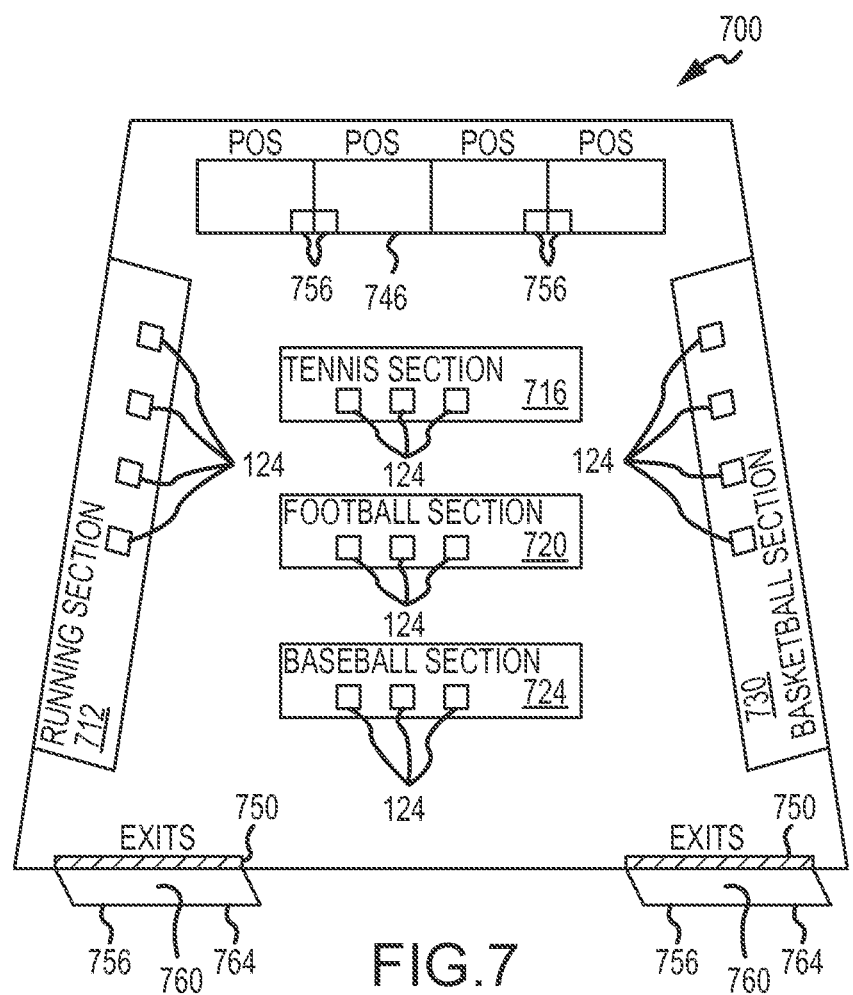
FIG. 7 is a schematic diagram of a retail store where items are offered for sale, in accordance with at least one embodiment.

Referring again to FIG. 5, the in-store content module 518 receives from the user device 102 of the user 110 a request to provide digital content related to one or more items 124 being offered for sale, selects digital content to send to the user 110, and sends the selected digital content. FIG. 7 provides a schematic diagram of an example retail store 700 where a user may be shopping when the user queries the in-store content module 518 for information about an item being offered for sale, in accordance with at least one embodiment. It should be appreciated that the retail store 700 is described herein for purposes of illustrating operation of the in-store content module 518 and other components of the digital experience manager 510. As such, the description of the retail store 700 is not intended to limit embodiments of the various inventions described herein.

Items 124 represent various items of athletic apparel and equipment being offered for sale in the retail store 700, which is categorized into several sections, including a running section 712, a tennis section 716, a football section 720, a baseball section 724, and a basketball section 730. Items 124 related to running are presented in the running section, items 124 related to tennis are presented in the tennis section 716, and so forth. By way of example, the items 124 presented in the football section 720 may include the jersey 124a, the shoe 124b, the shoelace 124c, the shorts 124d, and the football 124e of FIG. 3. A smart tag 120 is associated with each of the items 124 and stores, for example, an item identifier 430 unique to each item. Smart-tag readers 756 capable of communicating with the digital experience manager 510 are provided at point-of-sale (POS) terminals 746 and doorways 750. For example, the smart-tag readers 756 provided at the doorways 750 are embedded in or otherwise associated with floor mats 760 that users step on when entering and exiting the retail store 700. The smart-tag readers 756 are capable of reading smart tags associated with user items, such as shoes, when users walk across the floor mat 760. In this case, as described in more detail below, the smart-tag readers 756 of the floor mats 760 send the item identifier 430 along with "check-in" information to the digital experience manager 510 when a user wears, carries, or otherwise transports an item in and/or out of the retail store 700 via the doorways 750. Also for example, the smart-tag readers 756 provided at the POS terminals 746 notify the digital experience device 510 when items 124 are purchased, such as by sending the digital experience device 510 an item identifier 430 of the item 124 along with an indication that the item has been purchased by a user. According to embodiments, smart-tag writers 764 may be located near the doorways 750. In some examples, the smart-tag writers 764 are also embedded in or otherwise associated with the floor mats 760. The smart-tag writers 764 are capable of writing information on smart tags. For example, when a user 110 wearing shoes 124 having a smart tag 120 embedded therein steps on one of the floor mats 760, the smart-tag writer 764 writes on the smart tag 120 information that indicates time and location, e.g., geo-location, store identifier, venue identifier, etc. This information, for example, is stored on the smart tag 120 as check-in information and can later be used to unlock benefits (see FIGS. 21-22). It should be appreciated that this information may be written to a server, which stores the information in association with the smart tag 120 (e.g., the information is saved by an server or client computer in association with the item identifier of the smart tag 120). It should also be appreciated that the smart-tag writer 764 and the smart-tag reader 756 can be the same device.

FIG. 8 provides a flow diagram illustrating an example process 800 of a constructing and sending a request to obtain digital content related to an item. As indicated at 804, the process 800 generally begins when the user causes the electronic device to "scan" the smart tag of the item for which the user desires to receive digital content. For example, to scan the smart tag, the user 110 activates the NFC interface 228 of the electronic device 102, if the NFC interface is not already active, and positions the NFC interface 228 proximate to the smart tag 120 of the item 124. During the scan, the electronic device 102 obtains from the smart tag 120 the item identifier 430 associated with the item 124. The electronic device 102 may obtain additional information, such as instructions regarding which application to launch. It should be appreciated that the application could be a web browser, or an application designed specifically to scan smart tags and obtain digital content related to an item, or a general application for operating the NFC interface, etc. At 808, the electronic device launches the appropriate application, or prompts the user to download the appropriate application (see FIG. 6). As described above, the electronic device 102, upon receiving instruction code from the smart tag, automatically launches the appropriate application or sends the appropriate download request to the application download module 514 of the digital experience manager 510.

At 810, once the application is launched on the electronic device, the application displays a menu of options to the user. It should be appreciated that, as illustrated, upon the application launching at 808, the process 800 proceeds directly to 822, where an request is sent to automatically obtain digital content related to the item, such as price, video, images, etc. At 814, the user selects from the menu the option to get digital content related to the item. FIG. 9A provides an example screenshot 904 of a menu of options, including a "get info" option 908. At 818, responsive to the user's selection, the electronic device 102 constructs a request to provide digital content related to the item. The request includes the item identifier that was obtained from the smart tag 120 associated with the item. It should also be appreciated that the implicit or explicit request can include a user identifier of the user. At 822, the electronic device sends the request to the digital experience manager 510.

Figure 10:
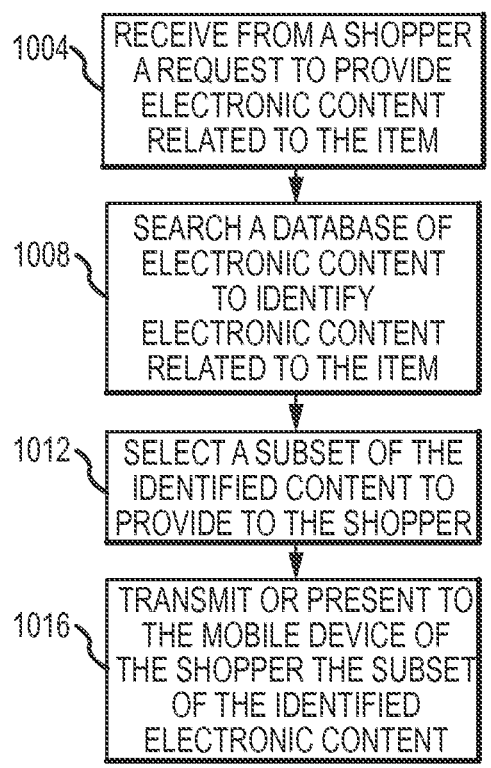
FIG. 10 provides a flow diagram illustrating an example process of delivering digital content related to an item being offered for sale, in accordance with at least one embodiment.

FIG. 10 provides a flow diagram illustrating an example process 1000, whereby the digital experience manager 510, in response to the user's request, delivers digital content to the electronic device of the user. At block 1004, the request to provide digital content is received. The request may be explicitly requested by the user, or it may automatically requested, without an explicit request by the user. At 1008, the in-store content module 518 searches the item information and digital content data stores 560, 572 to identify digital content related to the item. To do so, for example, the in-store content module 518 identifies all digital content associated with the item identifier included in the request. At 1012, the in-store content module 518 selects a subset of the identified digital content to provide to the user.

Figure 11:
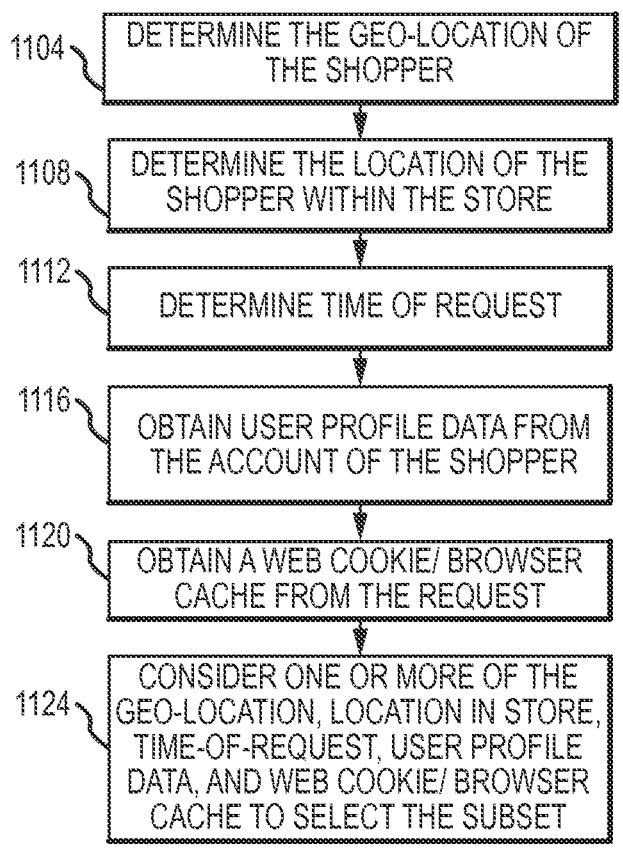
FIG. 11 provides a flow diagram illustrating an example process of selecting a subset of digital content related to an item, in accordance with at least one embodiment.

FIG. 11 provides a flow diagram illustrating an example process 1100, whereby the digital experience manager 510 selects a subset of the identified information to provide to the user. The process 1100 generally begins at 1104, where the geographic location of the user is determined. According to embodiments, the geographic location is provided in the request received from the electronic device. For example, the application that constructed the request obtained geo-location data from a GPS receiver of the electronic device and included the geo-location data in the request. In other examples, the request received from the electronic device included (e.g. in the header of the request) the language, country, region, city, time zone setting of the electronic device, and the geo-location of the user is inferred from that information. In still other examples the geo-location of the user is determined based on cell tower and WiFi location data included in the request from the electronic device. The in-store content module 518 determines which of the identified digital content is relevant to the geo-location of the user by assessing the relevance of the identified digital content to the geo-location of the user. For example, the in-store content module 518 assesses whether a language spoken in the geo-location of the user matches the language in which the digital content is presented. Also for example, the in-store content module 518 assesses the popularity in the geo-location of the subject matter of the identified digital content, where the subject matter of the identified digital content can be a sport, a sporting event, a team, a venue, an article of apparel, type of apparel, a style of apparel, and a brand of apparel.

According to embodiments, the language of the content presented to the user 110 of the electronic device 102 matches the language setting of electronic device 102. Thus, regardless of which country the user is located in when he 'taps' an item 124, content is presented in the language that matches the language setting of the user's electronic device 102. For example, German-language content is presented to a German user whose electronic device's language setting is German, even if the German user 'taps' an item to request digital content while vacationing in Spain. Thus, the German user is presented with German-language content, regardless where he is located when he uses his electronic device 102 to obtain digital content related to items 124. According to an embodiment, when the German user taps an item 124 and his electronic device 102 sends to the server 122 a request for digital content, the request includes the language setting of the electronic device. Responsive to the request, the server 122 selects content that is presented in a language that matches the language setting of the electronic device. It should appreciated that data other than the language setting can be used, such as the home country setting, the home city setting, the web browser version, the device identifier, etc.

At 1108, the location of the user and/or the item 124 within the store is determined. For example, with reference to the retail store 700 of FIG. 7, the in-store content module 518 determines whether the user and/or item is located in section 712, 716, 720, 724, or 730. According to some examples, the in-store content module 518 has access to a store map, similar to the schematic of FIG. 7, where the map details the locations of the items in the store based on item identifiers. For example, ranges of item identifiers are grouped into different locations of the store. Thus, using the map and the item identifier, the location of the user within the store can be determined. Additionally, the geo-location of the user can be cross-referenced against the map to determine the location of the user. As mentioned above, geo-location can be determined based on information obtained from the GPS receiver of the electronic device or from cell tower or WiFi location data. According to other examples, the location of the user within the store is determined based a product category to which the item belongs. For example, if the item is a basketball, then the user is determined to be in the basketball section of the store. The in-store content module 518 determines which of the identified digital content is relevant to location of the user in the store by assessing the relevance of the identified digital content to the location of the user. For example, if the user is in the tennis section of the store, then the in-store content module 518 identifies which of the identified digital content is related to tennis.

For example, when a user in a store looking at the soccer products taps his electronic device on a soccer boot, then he receives information about the desired soccer boot with a soccer display background and maybe specific soccer commercials and messages about the product from a famous soccer player. This experience should help the user to get the feeling that he is in a kind of a simulated soccer world. The same applies when the user is in the basketball area or running area within the shop. Within every area and every tapped sport product in a shop, the user receives tailored information about the product.

At 1112, the time at which the user sent the request is determined. For example, the time can be determined based on the time the request was received. In another example, the time of the request is included in the request itself, such as in the header of the request. The time may be the time of day, the time of week, the time of month, the time of year, and/or the calendar season. For example, in the event the time coincides with a sporting event that is popular in the user's geo-location, the in-store content module 518 identifies which of the identified digital content is related to the sporting event. In another example, retail stores may have "happy hours", where items are offered for sale at a special discount. In this example, in the event the time coincides with one of these "happy hours", the in-store content module 518 identifies which of the digital content is eligible for the happy hour and, optionally, provides the discounted price any item included in the digital content.

At 1116, user information, such as user profile data, about the user is obtained from the user information data store 564. For example, the user information includes a home address of the user, a number of related purchases made by the user in the past, a number of related product recommendations the user has made, and the number of times those product recommendations converted into product purchase by the user or others. Any other useful user data may be obtained from the user information data base 564. The in-store content module 518 determines which of the identified digital content is relevant to the user profile data. For example, the in-store content module 518 identifies digital content that is related to: a popular professional athletic team in the user's home location; the user's previous purchases; items the user has previously recommended; and/or items purchased by others at the recommendation of the user.

At 1120, a web cookie and/or browser cache is obtained from the request received from the electronic device, which includes information about the user's online browsing history, depending on settings and approval by the user. The in-store content module 518 identifies which of the identified digital content is related to the user's browsing history.

At 1124, the digital content identified at 1008 as being relevant to the item 124 is evaluated against the information determined and/or obtained at 1104, 1108, 1112, 1116, 1120, and/or 1124 to select the subset of digital content to send to the user. As discussed above, digital content may include, for example, text, images, video content, animated content, games, and links to websites, any of which could include information about the item 124. According to embodiments, from the digital content identified at 1008, the in-store content module 518 identifies a subset of digital content that is relevant to the user's geo-location and location within the store, the time of the request, the user's profile data, and/or the user's online browsing history, depending on settings and permission from the user.

Figure 9C:
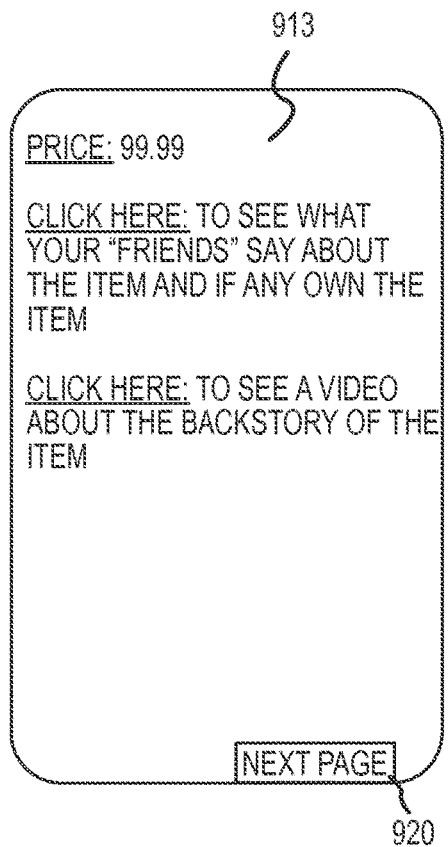

Referring again to FIG. 10, after selecting a subset of the identified digital content, the in-store content module 518 transmits or presents the subset to the electronic device of the user, at 1016. FIGS. 9B-C provide example screenshots of the subset of the identified digital content, as it is presented on the electronic device. As illustrated in the screenshot 912 of FIB. 9B, the digital content includes a description of the item, suggested items that the user might be interested in, a link to view a video of how the item was made, and current news and events related to the item. The screen shot 912 also includes a "next page" button 920. The user can selected button 920 to receive additional content related to the item. For example, if the user selects button 920 of screenshot 912, screen shot 913 of FIG. 9C is provided. As illustrated in screenshot 913, the digital content can also include the price of the item, a link to social network/media so that the user can see what his friends and others are saying about the item, and a link to a video about the backstory of the item. As illustrated in screenshot 914 of FIG. 9D, the digital content can also include a link to see how many of the items are in stock and the available color, sizes, annotations, etc. It should be appreciated that rather than providing a link, the actual inventory and available colors, sizes, and annotations can be provided directly to the user.

Figure 9D:

As illustrated in FIG. 9D, the user can also be presented with a "Purchase" button 924. This enables the user to purchase the item using the electronic device, and to avoid having to wait in line at a point-of-sale terminal. In some embodiments, the user information 564 includes the user's credit card and/or other payment and billing information. Upon selection of the "Purchase" button 924, the electronic device constructs and sends a purchase request to the digital experience manager 510. The purchase request includes the item identifier and the user identifier. The digital experience manager 510 uses the item identifier to obtain pricing information from the item information 560, and it uses the user identifier to obtain the user's credit card and/or other payment and billing information form the user information 564. The digital experience manager 510 then uses the obtained information to process the purchase transaction. The user can be provided with a confirmation code that the user can use to exit the store. For example, the confirmation code can be a barcode displayed on the user's mobile device that the store can 'scan' when the user exits the store. Also, for example, the digital experience manager 510 updates the item information 560 to indicate that the item has been purchased. Thus, upon leaving the store, the store can scan the smart tag of item to get notice that the item has been purchased.

With reference to FIGS. 12-15, the "virtual price tag" feature provided by the virtual price tag module 522 of the digital experience manager 510 will be described. According to embodiments, a user can scan an item being offered for sale and request, either manually or automatically, that a price of the item be displayed on the user's electronic device, where the price is adjusted based on information about the user.

Figure 12A:
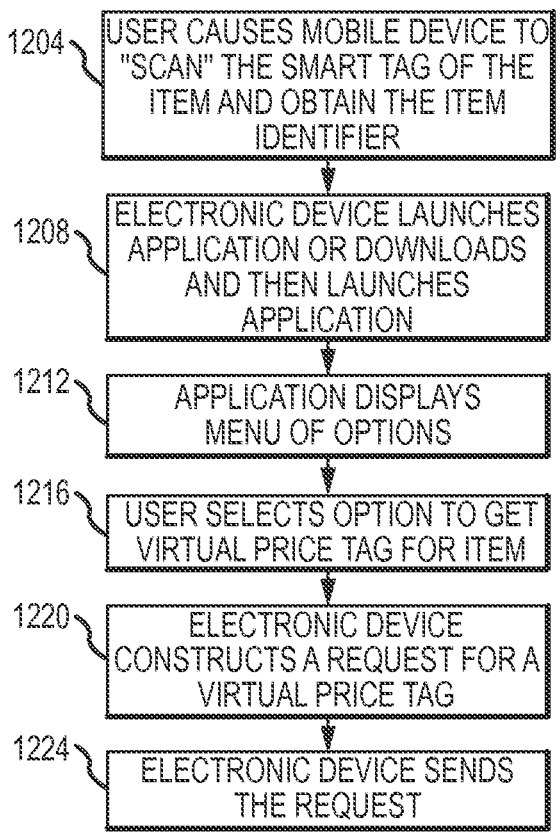
FIGS. 12A-B provide a flow diagrams illustrating example processes of sending a request to obtain a virtual price tag for an item being offered for sale, in accordance with at least one embodiment.

FIG. 12A provides a flow diagram illustrating an example process 1200 of constructing and sending a request to obtain a virtual price for an item. As indicated at 1204, the process 1200 generally begins when the user causes the electronic device 102 to "scan" the smart tag 120 of the item 124 for which the user desires to receive a virtual price. During the scan, the electronic device 102 obtains from the smart tag 120 the item identifier 430 associated with the item 124. The electronic device 102 may obtain additional information, such as instructions regarding which application to launch (e.g., the application could be a web browser that is already installed on the electronic device). At 1208, the electronic device launches, opens, switches to, or otherwise activates the appropriate application, or prompts the user to download the appropriate application, if the application is not already installed (see FIG. 6). As described above, the electronic device 102, upon receiving instruction code from the smart tag, automatically launches the appropriate application or sends the appropriate download request to the application download module 514 of the digital experience manager 510.

Figure 13:
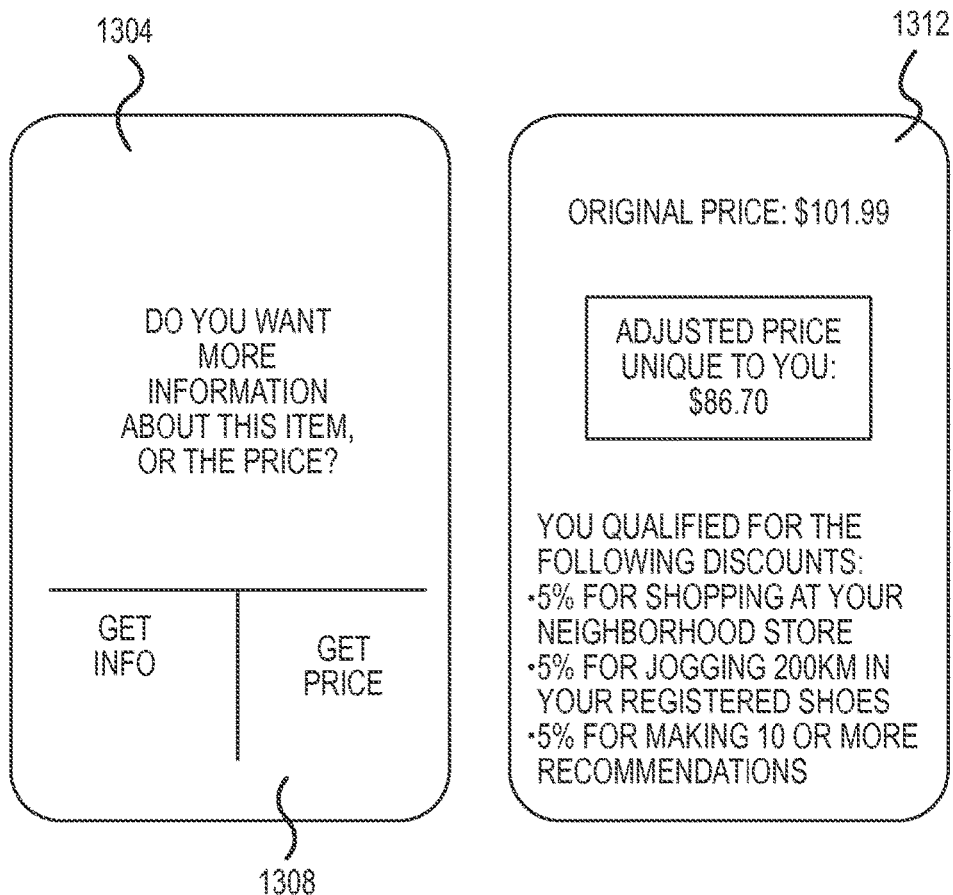
FIG. 13 is a schematic diagram of an example screenshot of a menu giving a user an option to obtain a virtual price tag for an item as well as an example virtual price tag, in accordance with at least one embodiment.

At 1212, once the application is launched on the electronic device, the application displays a menu of options to the user. At 1216, the user selects from the menu the option to get a virtual price tag for the item. FIG. 13 provides an example screenshot 1304 of a menu of options, including a "get price" option 1308. At 1220, responsive to the user's selection, the electronic device 102 constructs a request to provide a price for the item. The request includes the item identifier that was obtained from the smart tag 120 associated with the item. It should also be appreciated that the request can include a user identifier of the user. At 1224, the electronic device sends the request to the digital experience manager 510.

Figure 12B:
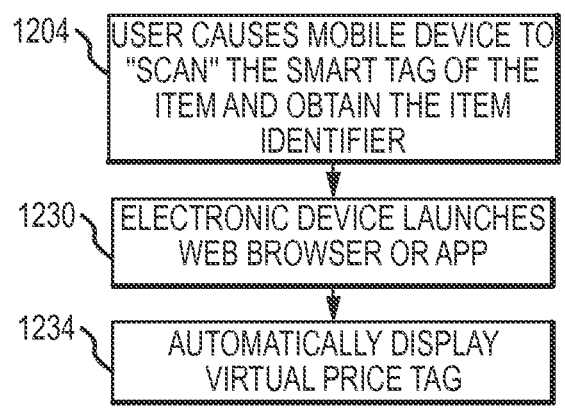

FIG. 12B provides a flow diagram illustrating another example process 1228 of constructing and sending a request to obtain a virtual price for an item. As indicated at 1204, the process 1200 generally begins when the user causes the electronic device 102 to "scan" the smart tag 120 of the item 124 for which the user desires to receive a virtual price. During the scan, the electronic device 102 obtains from the smart tag 120 the item identifier 430 associated with the item 124. At 1230, responsive to scanning the smart tag 120, the electronic device 102 launches a web browser or app that sends a request (e.g., http request) to obtain a virtual price tag for the item. For example, the web browser requests from a web server a webpage that provides a virtual price tag for the item 124. At 1234, the obtained virtual price tag is automatically displayed via the web browser or app. For example, the request webpage having the virtual price tag is displayed in the web browser.

Figure 14:
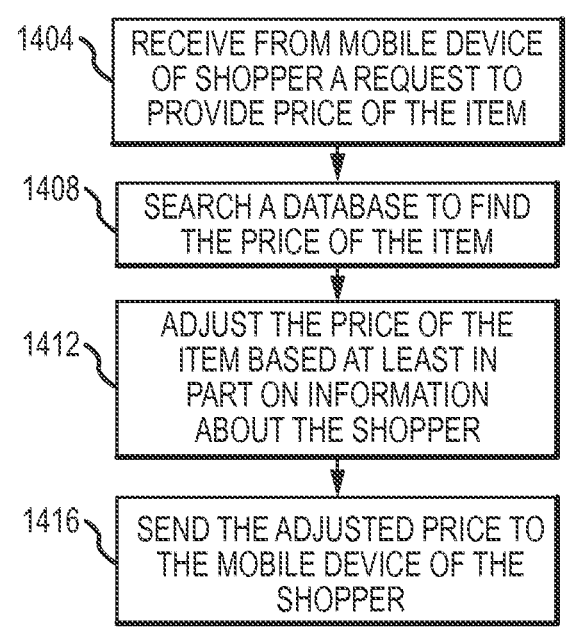
FIG. 14 provides a flow diagram illustrating an example process of delivering to an electronic device of a user a virtual price tag for an item, in accordance with at least one embodiment.

FIG. 14 provides a flow diagram illustrating an example process 1400, whereby the digital experience manager 510, in response to the user's request, delivers a price for the item to the electronic device of the user. At block 1404, the request to provide a price for the item is received. At 1408, the virtual price tag module 522 searches the item information data store 560 to identify pricing information for the item. To do so, for example, the virtual price tag module 522 identifies a listed retail price for the item. At 1412, the virtual price tag module 522 adjusts the listed retail price for the user based at least in part on information about the user.

Figure 15:
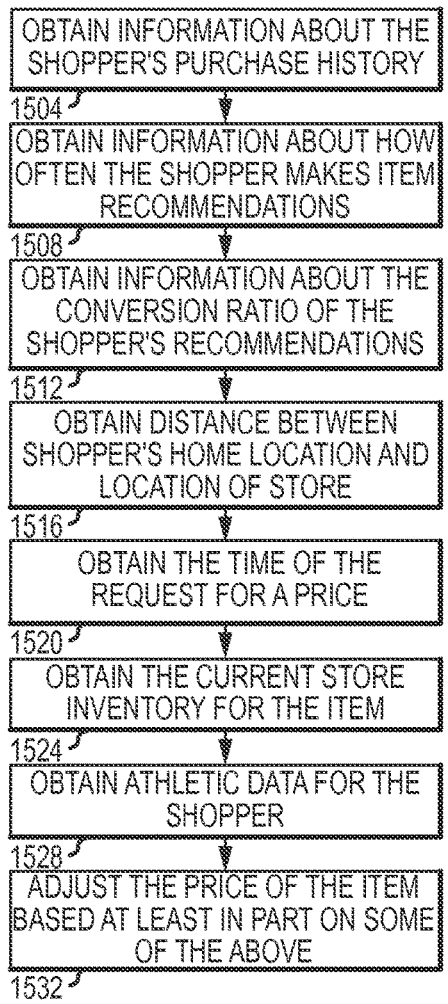
FIG. 15 provides a flow diagram illustrating an example process of adjusting a price of an item, in accordance with at least one embodiment.

FIG. 15 provides a flow diagram illustrating an example process 1500, whereby the digital experience manager 510 adjusts the price of an item. For example, the price may be reduced if the user is a loyal customer who purchases related items, recommends that other users purchase related items, etc. According to embodiments, the virtual price tag module 522 reviews information about the user in the user information data store 564 when adjusting the price of an item. For example, the user information data store 564 contains the user's user profile, which includes information regarding the user's history of purchases, the user's history of making purchase recommendations to other users, and how often the user's purchase recommendations are converted into actual purchases.

At 1504, the process 1500 generally begins with reviewing the user's purchase history. To do so, for example, the virtual price tag module 522 accesses the user's user profile data in the user information data store 564 to determine the number of related items previously purchased by the user. Also, for example, the virtual price tag module 522 obtains the user's purchase history from a cookie or browser cache, etc. associated with the user's web browser and/or electronic device 102, which was used to request the virtual price tag. Further, for example, the user may manually provide the digital content manager 510 with the user's purchase history, such as by including the purchase history in the request for the price tag. For example, if the user is a frequent purchaser of items associated with a particular manufacturer, brand, retailer, etc., then the virtual price tag module 522 reduces the listed retail price of the item accordingly. Also for example, if the user has never purchased or has not recently purchased items associated with a particular manufacturer, brand, retailer, etc., then the price may be reduced to incent the user to purchase. Further for example, the price may be reduced if the user has previously purchased competitor items.

At 1508, the virtual price tag module 522 reviews the user's recommendation history. For example, the virtual price tag module 522 accesses the user's user profile data in the user information data store 564 and reviews the user's history of making item recommendations to other users. In some cases, if the user frequently recommends that other users purchase items associated with a particular manufacturer, brand, retailer, etc., then the virtual price tag module 522 reduces the listed retail price of the item accordingly. At 1512, the virtual price tag module 522 reviews how often the user's recommendations are converted into actual purchases. For example, the virtual price tag module 522 accesses the user's user profile data to compare the number of recommendations to the number of conversions. Recommendations for items related to the item in question can be considered, as well as the recommendations across all items. For example, if the user has a high conversion rate, then the virtual price tag module 522 may reduce the price of the item so as to incent the user to recommend the item. Similarly, for example, the virtual price tag module 522 may reduce the price of the item if the user has a high number of conversions, even if the user has a lower conversion rate.

At 1516, the virtual price tag module 522 determines the distance between the user's home location and the location from where the user sent the request for a virtual price tag. According to an embodiment, the user's home location is provided in the user information data store 564. It should also be appreciated that the user's home location may be included in the request message received from the user's electronic device. For example, the application running on the electronic device that constructed and sent the request message could obtain from the electronic device the user's home city, country, zip code, etc., and include that information in the request message. The location from where the user sent the request can be determined according to any of the examples discussed above with respect to 1104 of FIG. 11. Once the virtual price tag module 522 obtains the user's home location and the location from where the request was sent, it then determines the distance there between. If the distance is fairly large, then the price is only slightly reduced or not reduced at all. This is because the user is likely traveling on vacation or business, and is therefore more likely to pay more. On the other hand, if the distance is short, indicating that the user is shopping near home, then the price may be reduced so as to incent the user to frequently shop at the location. In other embodiments, the discount is more significant if the distance is fairly large, and the discount is less significant is the distance is short.

At 1520, the virtual price tag module 522 determines the time at which the request was sent. This can be determined according to any of the examples discussed above with respect to 1112 of FIG. 11. As mentioned above, the time may be the time of day, the time of week, the time of month, the time of year, and/or the calendar season. For example, in the event the item is an article of clothing, such as a winter coat soon to go out of season, the price may be reduced. Also for example, if the time of the request coincides with a sporting event near the location of the request and the item is related to that event, then the price may be adjusted, even if the item is an article of clothing that is soon to be out of season.

At 1524, the virtual price tag module 522 determines the current inventory of the item. According to embodiments, inventory data may be included in the item information data store 560. Thus, upon receiving a request to provide a virtual price, the virtual price tag module 522 accesses the item information data store 560 to review inventory data of the item and determine the inventory of the item at the store from which the user sent the request. The inventory data may be organized by store, by item, and/or both. In one example, the price of the item may be reduced is there is a large inventory or (periodically) increased if there is a limited inventory.

At 1528, the virtual price tag module 522 reviews athletic data associated with the user. According to embodiments, athletic data may be included in the user information data store 564. Thus, upon receiving a request to provide a virtual price tag, the virtual price tag module 522 accesses the user information data store 564 to review the user's athletic/workout data. The athletic data may include, for example, data generated and used by athletic training applications operating on the user's electronic device, such as jogging routes and times, particular exercises and indications of when the user performed those exercise, notes, goals, accomplishments, physiological data, such as heart rate, calories burned, VO2 max, etc. The athletic data may also include the number of miles run, the number of miles run using or wearing a registered item 124, the number of hours of workouts, and the number of user registered items that are categorized as athletic apparel or equipment. In some examples, the virtual price tag module 522 may adjust down the price of the items based on the user's workout accomplishments. For example, if the user has run two hundred kilometers in the user's registered running shoes, then the virtual price tag module 522 may adjust down the price of qualified running shoes to incent the user to purchase a particular model, brand, style, etc. of running shoes. It should be appreciated that the athletic/workout data can be stored in a data store 130 and/or locally on the electronic device 102.

According to some embodiments, the price of the item can be based on future sharing (e.g., the user recommending the item to other users). For example, the user can be presented with the option to agree to provide a specific number of recommendations about the item within a specific amount of time. For example, the user may agree to recommend the product to one hundred friends on a social network or media with one week of purchasing the item. If the time expires and the number of recommendations has not been reached, then the user is charged for a prorated amount to cover the difference owed. It should also be appreciated that the user can made the recommendation as a perquisite to obtaining a discount on an item.

At 1532, the price of the item is adjusted based at least in part on evaluations made using the information obtained at 1504, 1508, 1512, 1516, 1520, 1524, and/or 1528. For example, after obtaining the listed retail price of the item from the item formation data store 560, the virtual price tag module 522 adjusts up or down the listed retail price based on said information.

Referring again to FIG. 14, after adjusting up or down the listed retail price of the item, the virtual price tag module 522 transmits the adjusted price to the electronic device of the user, at 1416. According to embodiments, the virtual price tag module 522 also transmits information about why the price was adjusted. For example, the virtual price tag module 522 may send an indication saying the price was adjusted because the user logged two hundred kilometers in a pair of registered shoes, made twenty recommendations to buy the shoes, and eight of the recommendations were converted in to actual purchases. FIG. 13 provides an example screenshot 1312 of the virtual price tag, as it is presented on the electronic device.

According to some embodiment, the user's "tapping activity" while shopping in a retail store can be shared with retail stores and other entities, subject to disclosure to the user and permission from the user. This data would benefit business by enabling tracking consumer behavior in store during shopping, looking at products and buying products. This would enable the business to target promotions to the user based on the users shopping habits.

Figure 16:
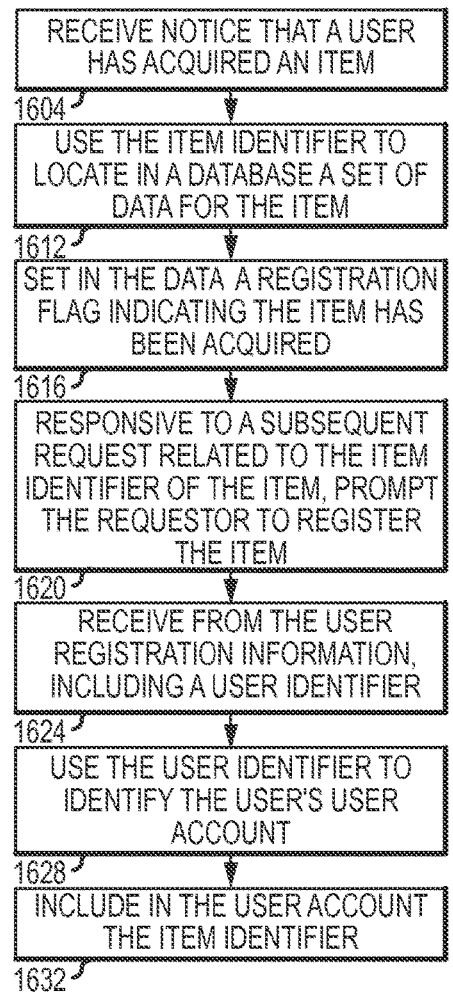
FIG. 16 provides a flow diagram illustrating an example process of receiving notice that an item has been purchased or otherwise acquired and registering the item to the acquiring user, in accordance with at least one embodiment.
Figure 17:
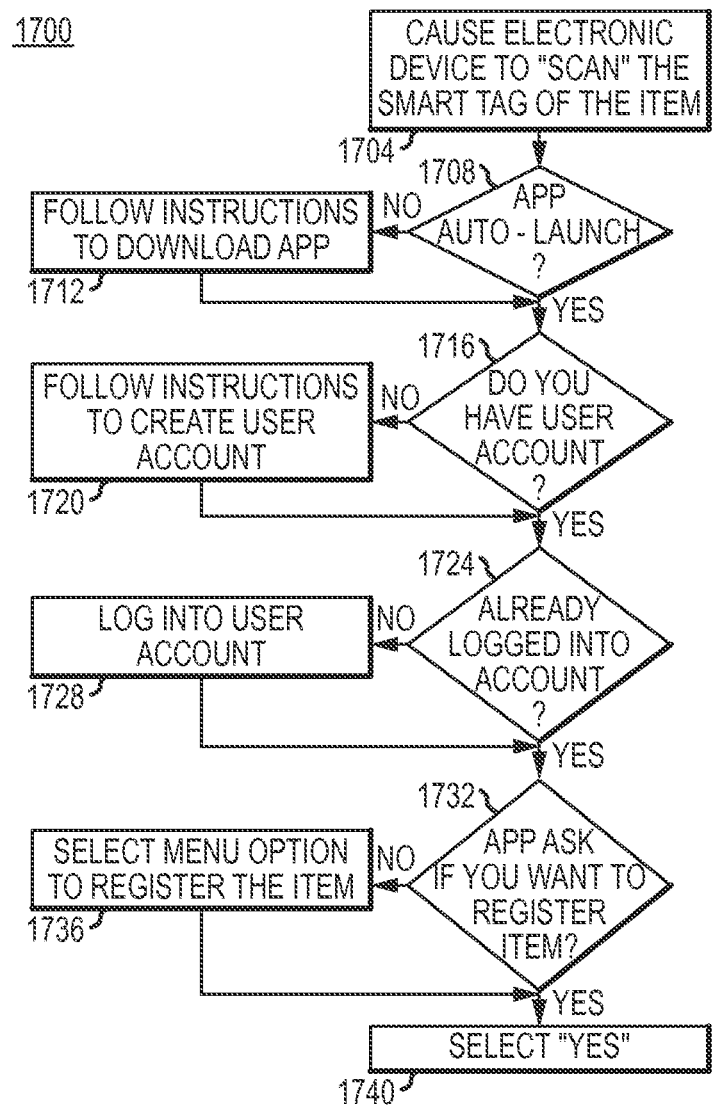
FIG. 17 provides a flow diagram illustrating an example process of using an electronic device to register an item, in accordance with at least one embodiment.

According to embodiments, after an item has been purchased or otherwise acquired, the purchasing or acquiring user can "tap" his electronic device 102 on the smart tag of the item to receive premium registered-owner content delivered to his phone. However, in some embodiment, the user must first register the newly purchased or acquired item. With reference to FIGS. 16-17, a process for registering an item to a user account of a user will be described. FIG. 16 explains the registration process from the perspective of the digital experience manager 510, whereas FIG. 17 explains the registration process from the perspective of the user 110.

FIG. 16 provides a flow diagram illustrating an example process 1600 of registering an item. At 1604, the process 1600 generally begins when the registration module 526 receives a notice that the item has been purchased or otherwise acquired by a user. The notice is transmitted via a purchase-indication message, which includes an item identifier for the item.

Below are three illustrative examples how the registration module 526 receives from a device a purchase-indication message. In a first example, with reference to FIG. 7, a smart-tag reader 756 at the POS terminal 745 is used to scan the smart tag 120 associated with the item 124 to obtain the item identifier 430 associated with the item, and then send the item identifier in a purchase-indication message to the registration module 526. In a second example, also with reference to FIG. 7, a smart-tag reader 756, such as a floor mat 760, located at an exit 750 of the retail store 700 scans the smart tag and obtains the item identifier as the item is being carried out of the store, and then sends the item identifier in purchase-indication message to the registration module 526. In a third example, where a user-seller is giving or selling the item to a user-buyer (rather than a user buying from a store), the user-seller can use his or her electronic device 102 to scan the smart tag 120 and send a purchase-indication message to the registration module 526 (e.g., an example of re-assigning an item to another user is discussed below with reference to option 2056 of FIG. 20A).

In another embodiment of this third example, the user-seller can give a code/PIN to the user-buyer, who can submit the code/PIN to registered the item. For example, after purchasing an item, the purchaser (i.e., the user-seller) can give the item to another user without prior registration of the item. This way, the purchased item is registered to the new owner and not to the purchaser. In some examples, the person who buys the product gets a PIN/code either on the receipt, on his mobile device or via email. This PIN/code is provided to the new owner, who can use the PIN/code to register the item. For example, the PIN/code can be included in the purchase-indication message that is sent to the registration module 526 at 1604. The outcome of this registration process would be the same as the new owner had purchased the product by himself.

At 1612, the registration module 526 uses the item identifier to locate registration data for the item. To do so, according to an embodiment, the registration module 526 uses the item identifier to locate in the registration information 568 a subset of registration data associated with the item. For example, the subset of registration data may be a record in a registration table or some other registration data associated with the item. It should be appreciated that registration data for the item may be included item information 560 and the user information 564.

At 1616, the registration module 526 sets a registration flag in the registration data of the item. The registration flag indicates that the item needs to be registered because it has been recently purchased or otherwise acquired. For example, to set the flag, the registration module 526 "flips a digit" in the item's registration data.

At 1620, the user sends a request to the digital experience manager 510 to obtain digital content related to the item. For example, this request could be sent by the new owner, who "tapped" his new item (e.g., a basketball) seeking to watch videos about the item. This request is sent from the user's electronic device 102 and includes an item identifier obtain from a smart tag 120 attached to the item. Responsive to the request, the registration module 526 looks up registration data to confirm the request was sent from the item's registered owner. In doing so, the server "sees" the registration flag. This tells the registration module 526 that the item needs to be registered. Thus, before delivering the requested digital content (e.g. video), the registration module prompts the user to register the item.

At 1624, the user sends to the registration module 526 his or her registration information. The registration information includes the user's user identifier. At 1628, the server uses the user identifier to look up user's account in the user information 654. At 1632, the item is registered to the user by including the item identifier or a reference to the item identifier in the user's account.

FIG. 17 provides a flow diagram illustrating an example process 1700 of a user using an electronic device to register an item. Users may desire to register purchased items so that the user may qualify for benefits provided by the digital experience manager 510. As indicated at 1704, the process 1700 generally begins when the user causes the electronic device to "scan" the item's smart tag, such as by activating the NFC interface 228 of the electronic device 102 and positioning the NFC interface 228 proximate to the item's smart tag 120. During the scan, the electronic device 102 obtains from the smart tag 120 the item identifier 430 associated with the item 124. The electronic device 102 may obtain additional information, such as instructions regarding the applications to launch (e.g., the application could be a web browser already installed on the electronic device). The electronic device launches, opens, switches to, or otherwise activates the appropriate application, or prompts the user to download the appropriate application, if the application is not already installed (see FIG. 6). According to decision block 1708, if prompted to download an application, the user at 1712 follows instructions to download and then launch the application.

According to embodiments, upon launching, the application sends the item identifier to the digital experience manager 510. The registration module 526 uses the item identifier to look up registration information for the item. When doing so, if the registration module 526 "sees" the registration flag that was set according to 1616 of process 1600, the registration module 526 prompts the user to register the item in his or her user account. However at 1716, if the user does not have a user account, the user follows instructions to create a user account at 1720. For example, the user may be asked to enter a username and password and/or email-address and/or basic demographic information. A user account is then created in the user information 564 and the user's information is stored in the user account.

At decision block 1724, if the user is not already logged into the account, then the user logs into the user account at 1728. For example, the user inputs his or her username and password and submits a login request to the digital experience manager 510. At this point, according to an embodiment, the registration module, as result of finding the registration flag, will cause the application running on the electronic device to automatically ask the user if he or she desires to register the item. However at 1732, if application does not automatically do so, then user selects the option to register the item at 1736 from an option menu. At 1740, the user selects "yes" in response of the question of whether he or she desires to register the item. This causes the registration module 530 to register the item to the user, as discussed above with reference to FIG. 16. It should be appreciated that the item can be automatically registered, without asking the user for permission and without the user having to manual request registration. For example, the user "taps" the smart tag and the electronic device 102 automatically sends a request that the item be registered to the account of the user.

Figure 18:
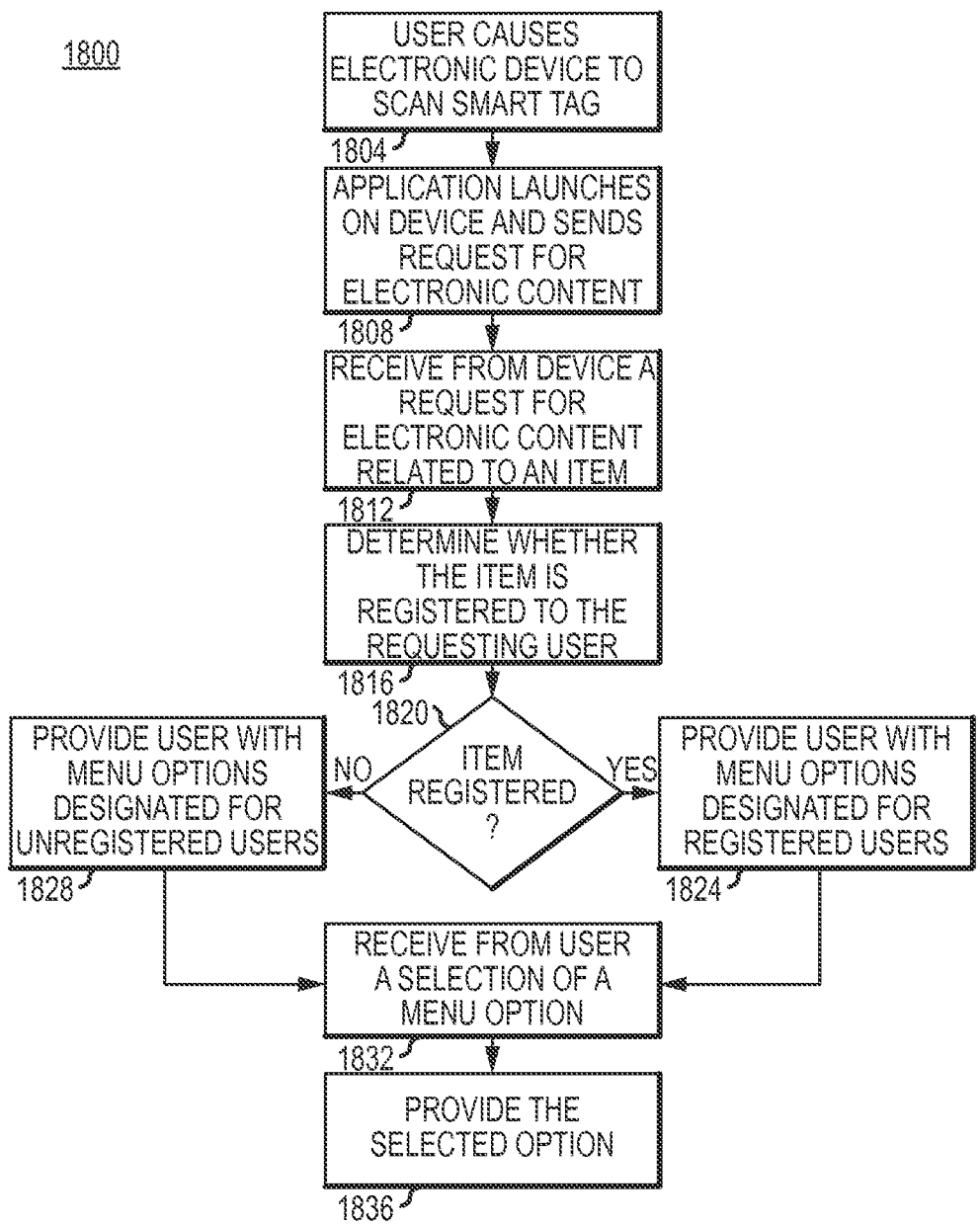
FIG. 18 provides a flow diagram illustrating an example process of receiving a user request to provide digital content related to an item, determining whether the requesting user is a registered owner or unregistered user, and providing the requested content, in accordance with at least one embodiment.
Figure 19:
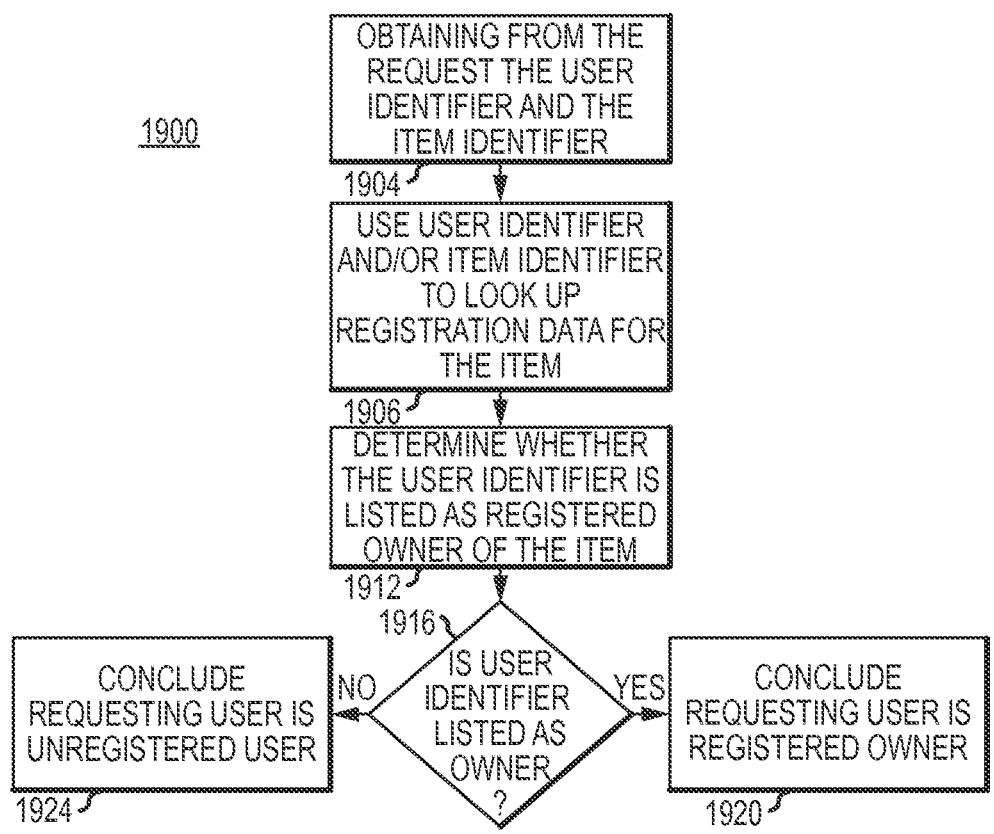
FIG. 19 provides a flow diagram illustrating an example process of determining whether a user requesting content regarding an item is a registered owner or unregistered user of the item, in accordance with at least one embodiment.

According to embodiments, a user can "tap" his phone on a smart tag of an item to obtain digital content related to the item. FIGS. 18-20 provide example processes for making this happen. In these examples, registered owners receive digital content designated for each registered owner. This is exclusive, premium content that provides an engaging digital experience, for example. On the other hand, unregistered users receive content designated for unregistered users. This content is sometimes more akin to marketing content, for example. According to the examples, a registered owner is a user of an item that purchased or otherwise acquired the item 124 and then registered item, such as according to processes 1600 and 1700. An unregistered user is a user of an item who is not registered as the owner. Such users may have purchased or acquired the item but did not register the item. Also, such users may be borrowing the item or may be friends or acquaintances of the registered owner and who "tap" the item. The users may be friends on social media, where their accounts are linked at friends.

Turning to FIG. 18, example process 1800 generally begins at 1804, where the user causes the electronic device to "scan" the smart tag of the item for which the user desires to obtain digital content. For example, to scan the smart tag, the user 110 activates the NFC interface 228 of the electronic device 102 and positions the NFC interface 228 proximate to the smart tag 120 of the item 124. During the scan, the electronic device 102 obtains from the smart tag 120 the item identifier 430 associated with the item 124. The electronic device 102 may obtain additional information from the smart tag, such as instructions regarding which application to launch, open, switch to, or otherwise activate. At 1808, the electronic device activates the appropriate application. For example, the instructions received from the smart tag may instruct the electronic device to activate a specific application, such as a jogging application. Also, for example, the electronic device may know, based on the item identifier, the category of the item (e.g., running shoe) and therefore automatically activate the appropriate application (e.g., jogging application). In yet another example, the electronic device may launch an athletic application that has several modes. In this example, if the item is a running shoe, then the application may start in a "running mode" so that the user can simply start running after tapping the shoe. Also in this example, if the item identifier of the item indicates that the item is in the category of cycling shoes, then the athletic application starts in "cycling mode." If the appropriate application is not already installed on the electronic device, the appropriate application is downloaded to the electronic device, as described in FIG. 6, and then launched. Upon launching, the application composes and sends to the digital experience manager 510 a request for digital content related to the item. The request includes the item identifier 430 obtained from the smart tag 120 as well as a user identifier of the user. For example, the user identifier may be a username, a number, a token, a serial number, a government-issued identification number, an International Mobile Station Equipment Identity (IMEI) number of the user's electronic device, or a code associated with the user's information in the user information data store 564. It should be appreciated that At 1816, upon receiving the request from the electronic device 102, the digital experience manager 510 determines if the requesting user is the registered owner. FIG. 19 provides an example process 900 for making this determination. The process 1900 generally begins at 1904, where the digital experience manager 510 engages the registration module 526 to obtain from the user's request an item identifier and a user identifier. At 1906, the registration module 526 uses the item identifier to look up registration information 568 for the item. For example, the registration module 526 may locate a registration record (a.k.a. subset of registration data) for the item. It should be appreciated that the registration record can be located in any or all of the item information 560, the user information 564, or the registration information 568. At 1912, the registration module 526 determines whether the user identifier is listed as the registered owner of the item. For example, the registration module 526 looks to see if the user's identifier is listed in the registration record as the owner. In this case, the user identifier or a reference or link to the user identifier may be included in the owner column of the record.

At decision block 1916, if the user identifier of the requesting user is listed or otherwise indicated as being the registered owner of the item, then a conclusion is made at 1920 that the requesting user is the registered owner of the item. However, if the user identifier of the requesting user is not listed or otherwise indicated as being the registered owner of the item, then a conclusion is made at 1924 that the requesting user is an unregistered user of the item.

According to an embodiment, in the event the requesting user is not listed as the registered owner of the item a determination is made regarding whether the user is associated with the registered owner, such as by a social network. For example, if the requesting user is "friends" with the registered owner on a social network or media, then the requesting user is treated the same as or similar to the registered owner.

Referring again to FIG. 18, at decision block 1820, if the item is registered to the requesting user (i.e., if the requesting user is the registered owner) or, optionally if the requesting user is "friends" with the registered owner, the process 1800 proceeds to 1824, where a menu of options designated for registered owners is presented to the user. According to an embodiment, to provide a menu of options designated for registered owners, the registered owner module 530 accesses the digital content 572 and searches through the available options to identify options that are tagged as being available for registered owners of the item. Also, for example, the registered owner module 530 accesses the user information 564 to identify the menu options designed in the user's user account. The user may have manually selected these options or the options may have been automatically inputted into the user account upon registration of the item. Further, for example, the registered owner module 530 accesses item information 560 to identify options available to registered owners of the item. The registration module 526 then compiles a list of available menu options and transmits the list for display by the electronic device of the user. For example, the registration module 526 transmits the list to the appropriate application operating on the electronic device, and the application displays the listed options to the user.

Figure 20A:
FIGS. 20A-E are schematic diagrams of example screenshots of menu options provided to registered owners and unregistered users, in accordance with at least one embodiment.

FIGS. 20A-E provide example screenshots of menu options that can be provided to users. It should be appreciated that the menu options of FIGS. 20A-E are merely examples and that many other options can be provided. Screenshot 2004 of FIG. 20A illustrates an example menu of options designated for registered owners. The screenshot 2004 includes a welcome message 2008 that provides the name of the item 124. An options menu 2012 is presented below the welcome message. The option menu 2012 includes the option 2016, which provides exclusive news and information. Selection of this option will, for example, give the user the option of selecting from special video, reports, pictures, and news that give the product "life," such as video that describes how, where, and by whom the item was produced, video that describes key features and uses of the item, video of interviews of other users, such as famous athletes, about how, when, and where they use the item, video that provides specifics about the item, and video that shows the item's triumphs, such as famous competitions (e.g., football matches) where the item (e.g., football) was used, images of athlete, messages from athletes, VIP messages, reports, etc. Option 2020 provides statistics and other information as well as video of famous individuals, such as athletes, that use the item. For example, this option may provide video of a famous athlete using the item. In one example, the item could be basketball shoes, and the video could feature a famous basketball player wearing the shoes while giving a basketball lesson.

Option 2020 may also provide statistics and news about the famous person and his or her use of the item. Option 2024 enables the user to check in at a location. For example, this option causes the electronic device to send location and time information to the check-in module 532 of the digital experience manager 510. The check-in module 532 saves this data in the check-in information data store 576. Checking in and associated benefits are discussed below in more detail. Option 2028 provides available games and contests for registered owners of the item. For example, if the item is sponsored by a famous athlete, an available contest may include checking the item in at qualifying events where the famous athlete competes and uses the item. The results of the contest can be posted on social media or within a special application on an electronic device. Option 2032 provides a link to an exclusive website for users. This web site may provide more videos, news, and other information about the item, exclusively available to registered owners. According to embodiments, the content displayed on the website may be influenced by the location of the electronic device when it "taps" the smart tag and requests digital content related to the item. The content of the website may also be influenced by the time of day, day of week/month, month of year, calendar season, locations of previous taps, locations of taps made by the user's social network friends, etc.

Option 2036 provides exclusive offers for registered owners of the item. For example, the offers may be coupons that users can redeem online or at merchant locations using their electronic devices. Option 2040 may launch a training or workout application, which automatically starts a workout for the user based on the item and/or the location of the user when he or she taps the item. For example, if the item is a running shoe and the user is outside when tapping, a running application or a training application may automatically launch and provide functionality specific to running. More specifically, for example, if item identifier included in the request indicates the item is a running shoe and/or if the request includes information indicating the requesting user is outdoors (e.g., the request includes GPS or other location data that indicates the user is outdoors, an indication that no WiFi signal is available, etc.), an inference is made the user is about to go for a run and thus a training application is automatically launched on the mobile device. In some examples, the workout application starts on the first tap and stops on the second tap, and the workout can be saved and/or synchronized on the digital content manager 510. Option 2044 provides the user with the user's personal training or workout information. It should be appreciated that personal training or workout information can be associated with the user or it can be associated with the item itself. For example, information associated with the user can be stored in the user's account in the user information 564. Such information can include the total distance that the user has run, regardless of which shoes or other items the user was wearing or using while running. On the other hand, for example, information associated with an item relates to workouts and training that has been done wearing or using that specific item (e.g., total distance run in shoes, regardless of user). In either case, the personal training or workout information could include speed, route, elevation, distance, time, calories burned, average/max heart rate, etc. and the statics could have been generated based on data received from devices attached to the user and/or the item. Such devices include accelerometers, GPS receivers, heart rate monitors, etc.

Option 2052 provides registered owners with the option of obtaining early or unique access to items not yet available online or at retail based on the user's profile information. For example, the user may select option 2052 and, based on his profile information, be presented with not-yet-released items that the user can learn about and optionally purchase using the user device 102. The purchased items can then be delivered to the user's home or held at the local retail store for pick-up.

Option 2056 provides registered owners or other users with the option of re-assigning the item to another user. For example, in the event the registered owner sells or gives the item to another user, the registered owner can select option 2056 to reassign the item to the new user. In some embodiments, upon selecting option 2056, the user is prompted to input the name, user identifier, or some other indication of the user to whom the item is to be re-assigned. Up doing so, the digital content manager 510 updates the registration information 568 to reflect that the item is now assigned to the new user. Thus, the privileges of being a registered owner transfer to the new owner.

Figure 20B:
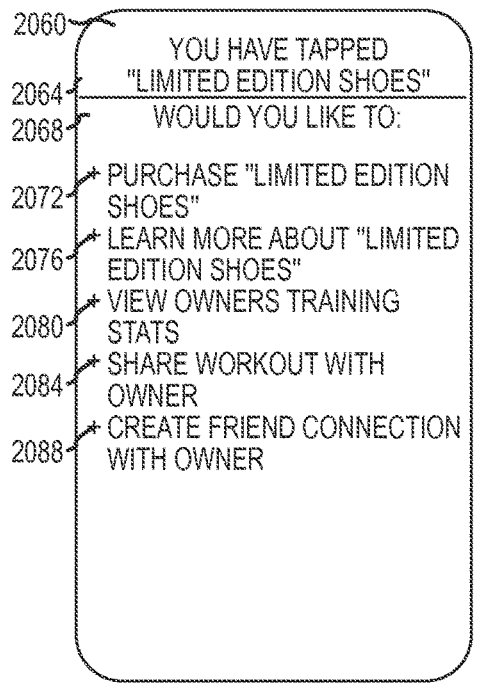
Figure 20C:
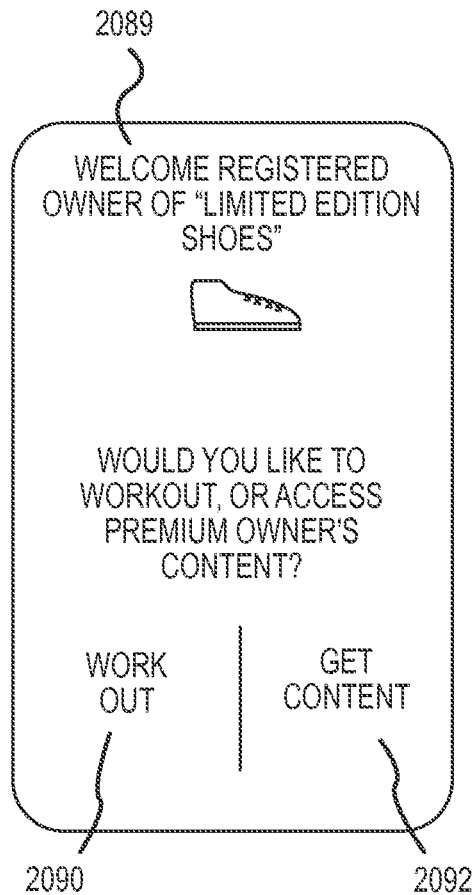
Figure 20D:
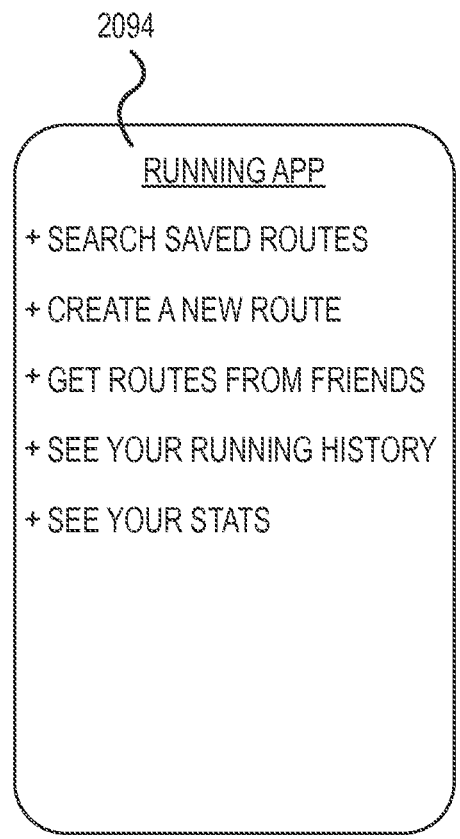
Figure 20E:

Screenshot 2089 of FIG. 20C illustrates another example menu of options designated for registered owners. As illustrated, upon scanning the item, the user is presented with an image of the item as well as a description of the item. The screenshot 2089 also provides users with a "workout" button 2090 that starts a workout application (e.g., miCoach® Application offered by Adidas®). Upon selecting this button, for example, the user is presented with screenshot 2094 of FIG. 20D. In this example, the workout application is a running application. As illustrated, the user can search saved routes, create a new route, get routes from friends (link to social networks), see the user's running history (e.g., log of historical runs), and see the user stats. The running application of FIG. 20D is just one of many example workout applications.

Referring again to the screenshot 2089 of FIG. 20C, the user is also presented with a "get content" button 2092. Upon selecting this button, for example, the user is presented with screenshot 2096 of FIG. 20E, where the user can click to see exclusive offers, see training videos from famous athletes that use the item, recommend to item to friends (e.g. via social media), and see a video on how to care for the item. These are just a few example options that can be presented to the user. It should be appreciated that other information related to the item can be provided.

For example, the item can be a soccer ball having a smart tag inside one of the ball panels so that when tapped by an electronic device, specifics about the ball come to life on the device. For example, the electronic device may provide a "road to production" video, a "how the ball was tested" video, a "where the ball was manufactured", and a "when the ball was announced to the public" video. It should be appreciated that the registered owner of an item is able, via tapping on the smart tag on the item, to see and track the product through manufacturing, distribution and store inventory. This is more or less the supply chain. This could be used for regular products as well as for customized products. Also, each day during the famous soccer tournaments, original and exclusive video about the ball's triumphs in the tournament are available for the owner and his friends who have electronic devices. Content could be tied directly to the ball and those purchasing the ball after the famous tournament has started will be able to review previous days.

In another example, the item can be shoes that are sponsored/promoted by a famous basketball player. A smart tag is provided inside the shoe to enable tap by electronic devices to get exclusive stats and videos for the famous basketball player on a daily basis. Dynamic visuals can be show the basketball player's shooting locations on the court. Also, acceleration and performance data can be made available for shoes that have accelerometers and other types of performance sensors.

In yet another example, the item may be made of advanced technology. The item may include a smart tag to enable tap by electronic devices to see video of key features, testing videos, information about the item, such as material used who else is wearing or using the item.

According to embodiments, if someone, such as an unregistered owner 'taps' on an item registered to an owner, then they may get preferred pricing for that item based on the owner's profile information. In some cases, upon tapping on the item, the unregistered user gets access via his mobile device to a webpage where the user can purchase the item at a preferred price. In other embodiments, upon tapping the shoe, a voucher is created and sent to the mobile device of the unregistered user. The voucher may be redeemed at retail locations to obtain the tapped on item or other items at a preferred price. This could make the registered owner popular among their friends and provide incentives for others to purchase and share.

Referring again to FIG. 18, at decision block 1820, if the item is not registered to the user, a menu of options designated for unregistered users is provided to the requesting user at 1828. According to an embodiment, to provide a menu of options designated for unregistered users, the unregistered user module 534 accesses the digital content 572 and searches through the available options to identify options that are tagged as being available for unregistered users of the item. Also, for example, the unregistered user module 534 accesses the user information 564 to identify the menu options designed in the user's user account. The user may have manually selected these options. Further, for example, the unregistered user module 534 accesses item information 560 to identify options available to unregistered users of the item. The unregistered user module 534 then compiles a list of available menu options and transmits the list for display by the electronic device of the user. For example, the unregistered user module 534 transmits the list to the appropriate application operating on the electronic device, and the application displays the listed options to the user.

As mentioned above, FIGS. 20A-E provide example screenshots of menu options that can be provided to users. It should be appreciated that the menu options of FIGS. 20A-E are merely examples and that many other options can be provided. Screenshot 2060 of FIG. 20B illustrates an example menu of options designated for unregistered users. The screenshot 2060 includes a welcome message 2064 that provides the name of the item 124. An options menu 2068 is presented below the welcome message. The option menu 2068 includes option 2072, which provides the option to purchase the same item. For example, selection of this option 2072 provides the electronic device's web browser to a uniform resource locator (URL) associated with an online merchant, where the unregistered user can purchase the item. According to embodiments, the URL includes a code associated with the item that represents the exact configuration of the item (e.g., color scheme, materials, logos, size, etc), such that the user does not have to manually input this information. According to embodiments, if the user who tapped the item decides to purchase the item, the owner gets credit for the referral. Option 2076 enables the user to learn more about the item by providing the user with related news, information, and marketing content. Selection of this option will, for example, give the user the option of selecting marketing and information video/images/reports about the product and how to purchase the product, or directly purchase the product. According to embodiments, if the user purchases the item, the owner gets credit, reward, batch, points, etc. for the referral. This option can also provide the user with any of the content mentioned above with reference to options 2016, 2020, and others.

Option 2080 provides the user with the owner's personal training or workout information, depending on the owner's privacy settings. For example, it provides the current training statistics of the owner and/or the statistics specific to the item, such as distances, jump height, number of workouts, kind of workouts, age of shoes or apparel or other data which is saved on the server 122 and/or mobile device 102. Option 2084 gives the user the option to transmit his or her workouts (e.g. performance info and route) to the smart tag of the item, or to copy from the smart tag the owner's stored workouts. For example, the workouts could be jogging routes, cycling routes, swimming laps, cross-training exercise, etc. The information could also be the owner's statistics, such as basketball statistics. For example, the owner could use his or her electronic device to write statistical data to the smart tag of the item, and others can user their electronic device to copy the data. If the person who was tagged does not have an account, then an account can be created for them based on their email address. Once they claim the account they will have a workout history waiting for them. Option 2088 enables the user to create a friend connection with the user on a social network. For example, selection of this option after scanning the smart tag could cause the user's electronic device to send a friend request to the social network. According to some embodiments, mutual tagging of item automatically creates a friend connection on a social network.

According to embodiments, an owner/user can provide his emergency contact information to the digital content manager 510. For example, the emergency contact information may be stored in the user's account in the user information 564. In the event of an emergency, a non-registered user (e.g., hospital personnel) can scan the smart tag of one of the owner's registered products to obtain the owner's emergency contact information (e.g., phone numbers of people to contact in case of an emergency) as well as other emergency information, such as medical information (e.g., blood type, allergic to penicillin, etc). For example, if an owner is injured while jogging, emergency personnel can scan the smart tag of his shoes to obtain his emergency contact information and his medical information.

Referring again to FIG. 18, at decision block 1832 the user's selection of a menu option is received. For example, after a registered owner selects one of the options presented on option menu 2012, the registered owner's electronic device sends an indication of the selection to the registered owner module 530. Similarly, for example, after an unregistered user selects one of the options presented on option menu 2068, the unregistered user's electronic device sends an indication of the selection to the unregistered user module 534. At 1836, the selected option is provided to the user. For example, if the user is a registered owner, the registered owner module 530 accesses the digital content data store 572 to identify the appropriate digital content to send to the electronic device of the registered owner. It should be appreciated that other modules, such as the unregistered user module, the lock & key module, the timeline module, etc., can select and send digital content to the user.

Figure 21:
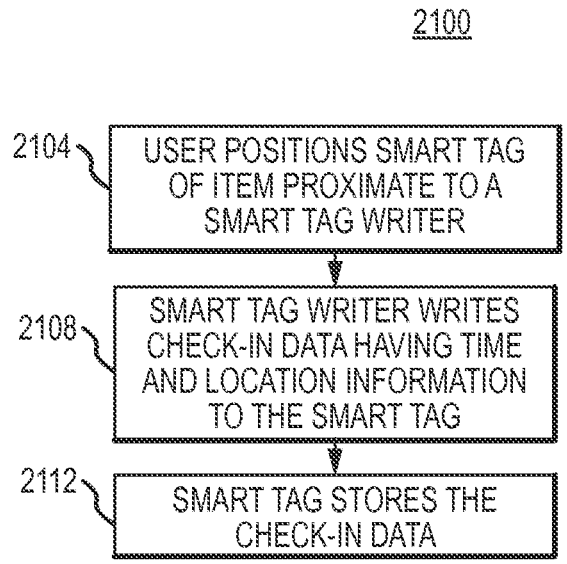
FIG. 21 provides a flow diagram illustrating an example process of "checking in" at a location and storing check-in data on a smart tag associated with an item, in accordance with at least one embodiment.

With reference to FIGS. 21-23, example processes are provided for unlocking benefits. For example, a user may unlock a benefit by "checking in" an item, such as a jersey or a pair of shoes, at particular locations according to a prescribed schedule. For example, the prescribed schedule may specify that a user "check in" at least ten professional basketball games in a single season. Upon the user satisfying the prescribed schedule of check-ins, the benefit is unlocked. Benefits can include just about anything. In the above basketball example, the benefit may be free admission to the eleventh basketball game, eligibility to use the express lane when entering future basketball games, ticket upgrades, discounts on concessions and other items, access to premium digital content, such as behind-the-scenes video of your favorite team, and so forth. In some embodiments, the benefit is delivered to the user's electronic device in the form of a digital ticket, coupon, token, etc.

With reference to FIGS. 21-23, example processes are provided for unlocking benefits. For example, a user may unlock a benefit by "checking in" an item, such as a jersey or a pair of shoes, at particular locations according to a prescribed schedule. For example, the prescribed schedule may specify that a user "check in" at least ten professional basketball games in a single season. Upon the user satisfying the prescribed schedule of check-ins, the benefit is unlocked. The benefit can be any one of seeming endless possible benefits. In the basketball example above, the benefit may be free admission to the eleventh basketball game, eligibility to use the express lane when entering future basketball games, ticket upgrades, discounts on concessions and other items, access to premium digital content, or such as behind-the-scenes video of the user's favorite team. In some embodiments, the benefit is delivered to the user's electronic device in the form of a digital ticket, coupon, token, etc.

Turning to FIGS. 21 & 22, an example process 2100 generally begin at 2104, where a user checks in at a location by positioning a smart tag associated with an item proximate to a smart-tag writer. At 2108 the smart-tag writer writes check-in data to the smart tag, and at 2112 the smart tag stores the check-in data. The smart tag data may include time and location-identifying information, e.g., geo-location, store identifier, and venue identifier.

With reference to FIGS. 1 and 7, an illustrative example of process 2100 will be provided. At 2104, the user 110 checks-in at the retail store 700 when the user steps his shoe 124 on the floor mat 760 proximate the smart-tag writer 764, which writes check-in information to the smart tag 120 associated with the shoe 124. The check-in information can include an item identifier of the item, a time of the check-in and a location.

Process 2200 of FIG. 22 illustrates unlocking a benefit, in embodiments where check-in data is stored locally on a smart tag. At 2204, a user positions a smart tag of an item proximate to a smart-tag reader, and at 2208 the smart-tag reader obtains from the smart tag check-in data for the item. For example, with reference to FIGS. 1, 5, and 7, the user 110 steps his shoe 124 on the floor mat 760 proximate the smart-tag reader 756, which obtains check-in data from the smart tag 120.

At 2212, the smart-tag reader sends the check-in data to a server. For example, the smart-tag reader 756 of FIG. 7 sends the check-in data to the digital experience manager

510. At 2216 the server locates benefit information comprising one or more prescribed schedules of check-ins. For example, the lock & key module accesses the benefit information 580. As discussed above, a prescribed schedule of check-ins specifies check-in locations and corresponding times required to unlock at benefit.

At 2220, the server determines if the check-in data obtained from the smart tag satisfies any of the prescribed schedules of check-ins located in the benefit information 580. For example, the lock & key module 538 compares the check-in data obtained from the smart tag 120 against to benefit information 580 to determine if the check-in data satisfies any of the prescribed schedules of check-ins located in the benefit information 580. At decision block 2224, if any of the prescribed schedules of check-ins are satisfied, the lock & key module 538 unlocks the corresponding benefits at 2228. Referring again to decision block 2224, if none of the prescribed schedules of check-ins are satisfied, the server does not unlock any benefits at 2232.

Turning to FIG. 23, a flow diagram is provided illustrating an example process of "checking in" at a location, storing check-in data on a server (rather than on a smart tag as in FIGS. 21-22), and unlocking qualifying benefits. At 2304, a user positions a smart tag associated with an item proximate to a smart-tag reader, and at 2308 the smart-tag reader obtains an item identifier from the smart tag. For example, with reference to FIGS. 1, 5, and 7, the user 110 steps his shoe 124 on the floor mat 760 proximate the smart-tag reader 756, which obtains the item identifier of the shoe 124 from the smart tag 120.

At 2312 the smart-tag reader sends a check-in message to a server, and at 2316 the server stores the check-in message. For example, the smart-tag reader 756 sends a check-in message to the check-in module 532, which stores the check-in message and/or the information therein in the check-in information 576. To store the check-in message, the check-in module 532 uses the item identifier included in the check-in message to locate a sub-set of check-in information 576 for the item and stores therein the location and time information obtained from the check-in message.

The server looks to see if the user is eligible to unlock any benefits. At 2324 the server locates benefit information comprising one or more prescribed schedules of check-ins. For example, the lock & key module 538 accesses the benefit information 580. As discussed above, a prescribed schedule of check-ins specifies check-in locations and corresponding times required to unlock at benefit. At 2328, the server determines if the check-in data obtained from the smart tag satisfies any of the prescribed schedules of check-ins located in the benefit information 580. For example, the lock & key module 538 compares the check-in data obtained from the smart tag 120 against the benefit information 580 to determine if the check-in data satisfies any of the prescribed schedules of check-ins located in the benefit information 580. At decision block 2332, if any of the prescribed schedules of check-ins are satisfied, the lock & key module 538 unlocks the corresponding benefits at 2336. Referring again to decision block 2332, if none of the prescribed schedules of check-ins are satisfied, the server does not unlock any benefits at 2340.

As mentioned above, the benefit may be delivered to the electronic device of the user and may be priority access at a location or event. For example, services can be delivered directly to their mobile phones via text message, email or push message. In another example, the owner gets direct access to a sales person in a shop when he walks over a mat which is lying at the entrance. The sales person immediately walks up to the owner and gives him a premium service. Also, for example, at a concert or soccer match, the owner can use a separate entrance or fast lane. To get such access, the owner walks over a mat with his special registered pair of shoes. Further, for example, the owner gets tailored marketing campaigns and product discounts at popular destinations with the requisite of wearing a specific pair of shoes or other items.

Figure 24:
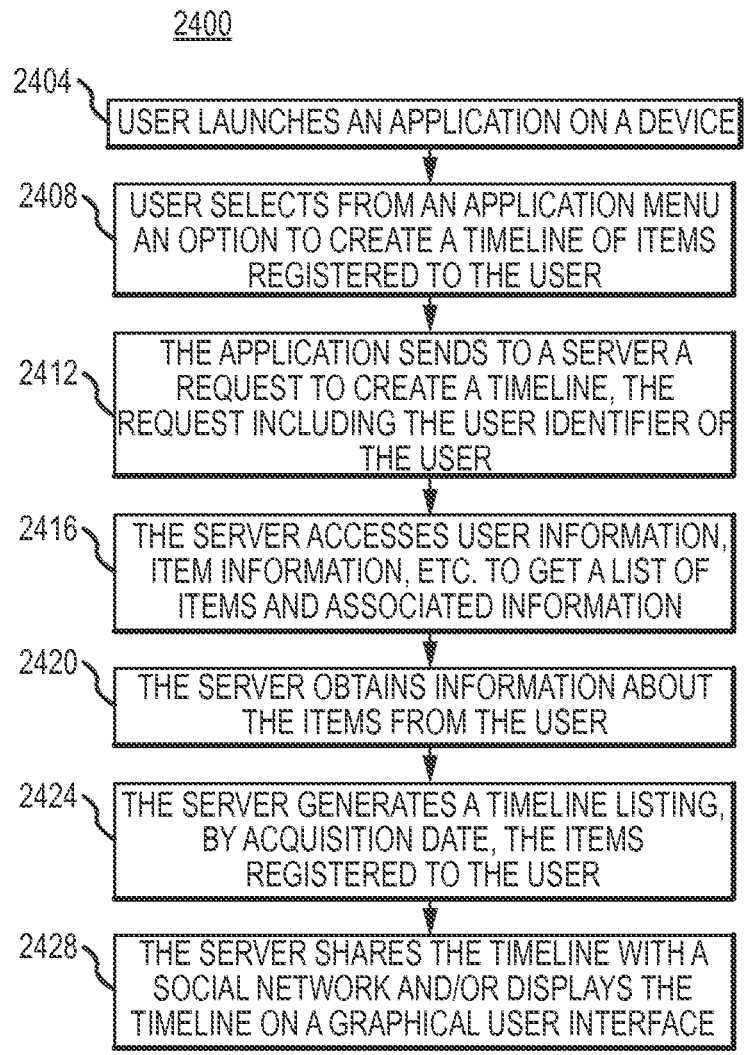
FIG. 24 provides a flow diagram illustrating a process of creating a timeline of information related to one or more items.
Figure 25:
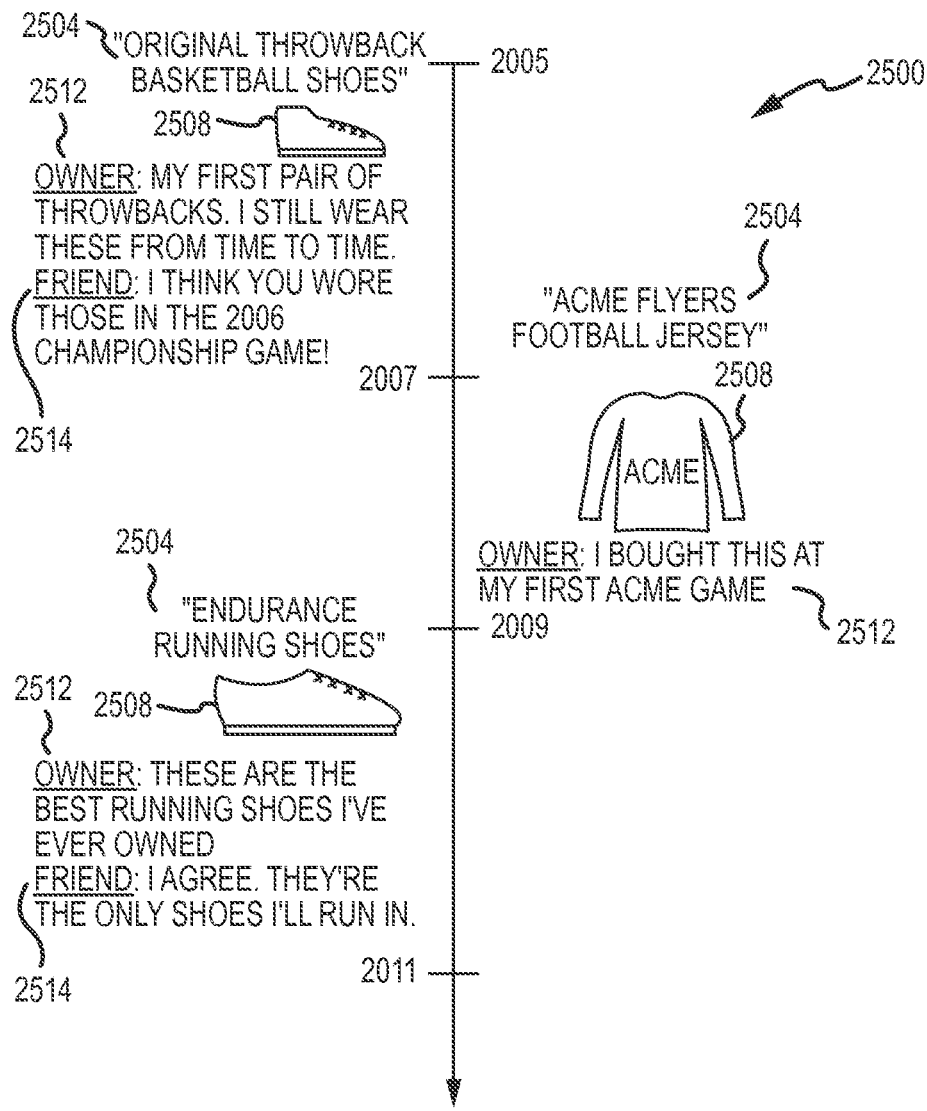
FIG. 25 is a schematic diagram of a screenshot of an example timeline created according to the process of FIG. 24, in accordance with at least one embodiment.

Referring to FIG. 24, a flow diagram is provided illustrating a process 2400 of creating a timeline of information related to one or more items. FIG. 25 is a schematic diagram of a screenshot of an example timeline 2500 created according to process 2400, in accordance with at least one embodiment. The illustrated timeline 2500 lists a user's items in chronological order by date-of-acquisition. For each item, the timeline may include an item description 2504, a photograph or image 2508, user notes and comments 2512, and friends' notes and comments 2514. It should be appreciated that other information may be provided, such as links to webpages where the items can be purchased and/or where more information about the items may be obtained, user reviews of the items, etc. The timelines created herein can be shared on social networks and/or in private cloud folders.

At 2404, the process 2400 generally begins when a user launches an application on an electronic device and at 2408 selects from an application menu an option to create a timeline of items. For example, to launch the application, the user may access the electronic device and select the icon associate with the item. Also for example, the user may launch the application by scanning a smart tag associated with an item. Once the application launches, according to an embodiment, the user is presented with a user interface similar to screenshot 2004 of FIG. 20, and the user selects Option 2048 ("Create timeline") from the menu 2012. It should be appreciated that timeline could also be an inventory or dashboard of the user's registered items. For the registered items, the timeline may display or provide a link to additional information, such as distances, number of workouts, number of hours in operation, awards, rewards, batches, points, credits, etc. The timeline can be saved in data store 130, such as in the user information 564, the item information 560, etc. The timeline can also be save and presented by social networks, which can be opened with several apps or web browsers on several devices.

At 2412, the application sends to a server a request to create a timeline, where the request includes a user identifier of the user. For example, the electronic device 102 sends a request, including the user identifier of the user, to the timeline module 542 of the digital experience manager 510. At 2416 the server obtains registration information related to one or more items so as to compile a list of items and associated information. For example, the timeline module 542 uses the user identifier to search the user information 560 and/or the registration information 568 to identify items associated with the user, including the item identifiers, dates of acquisition, user comments, user photographs of items, etc. After identifying the items, the timeline module 542 may use the item identifiers to search the item information 560 to obtain item descriptions, images, links to webpages where the items may be purchase or where more information may be obtained, etc.

At 2420, the server obtains information about the items from the user. For example, the timeline module may prompt the user, via the electronic device 102, to provide comments about the one or more items. As illustrated in FIG. 25, the user provides comments about the items, such as "My first pair of throwbacks. I still wear these from time to time." It should be appreciated that the information obtained from the user may include any of the registration information obtained at 2416.

At 2424, the sever generates an item timeline for the user. For example, the timeline module 542 compiles the information obtained at 2416 and 2420 into a template that results in timeline, such as timeline 2500, that lists items in chronological order by date-of-acquisition and that includes item descriptions, photographs and images, user notes and comments, etc. It should be appreciated that the timeline may include any other suitable information about the items. Further, it should be appreciated that the timeline does not have to be chronologically organized. For example, it could be organized by item category, item popularity, etc. The timeline could also be organized in any manner specified by the user. At 2428, the server displays the item timeline in a graphical user interface or shares the timeline with a social network, where friends may comment, such as comments 2514. For example, the timeline module 542 may transmit the timeline to the electronic device 102 for display via the display 208.

Figures 26, 27:
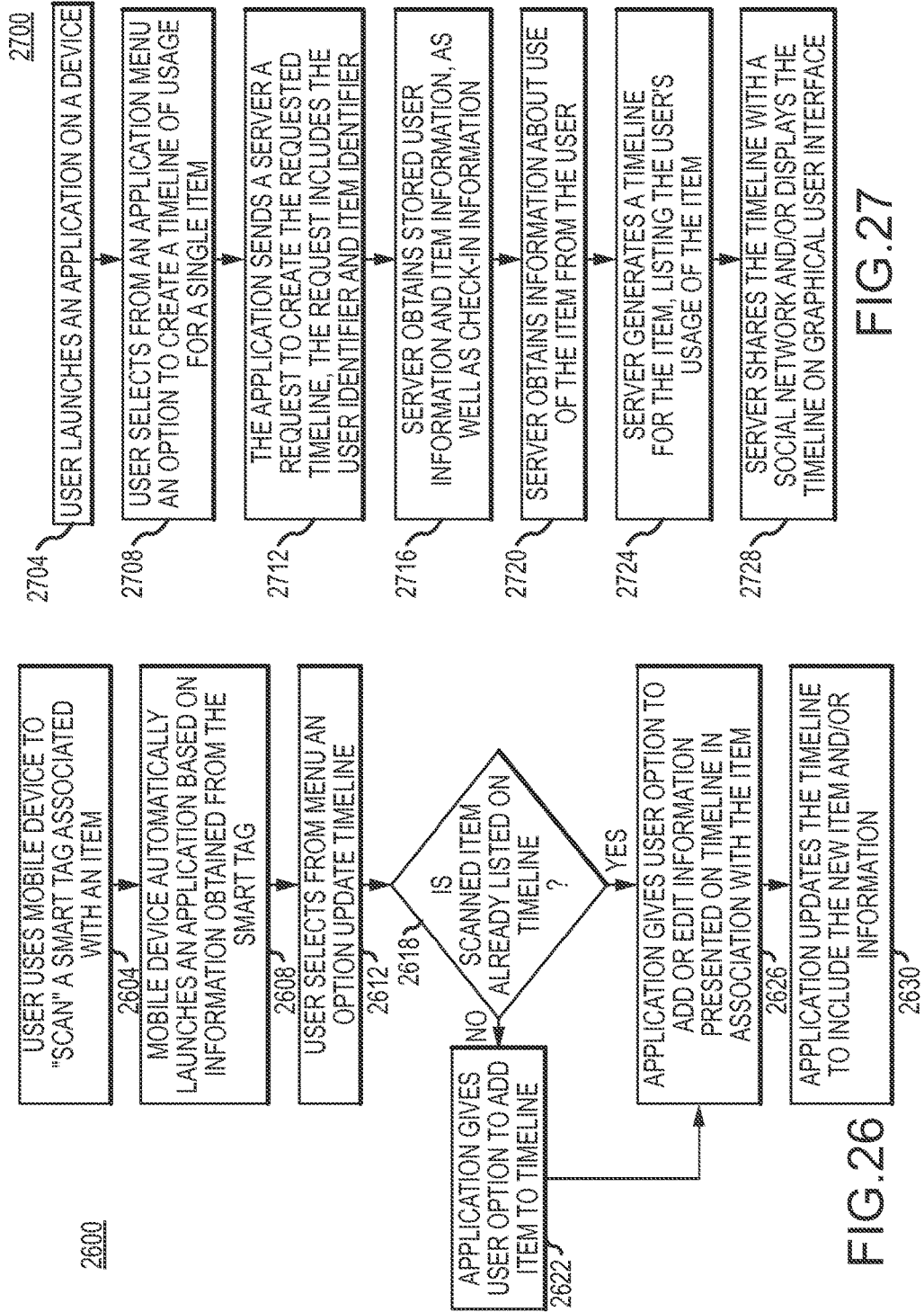
FIG. 26 provides a flow diagram illustrating a process of adding an item to an existing timeline and/or updating an existing timeline, in accordance with at least one embodiment.
FIG. 27 provides a flow diagram illustrating a process of creating a timeline of events associated with an item, in accordance with at least one embodiment.

FIG. 26 provides a flow diagram illustrating a process 2600 of adding an item to and/or updating an existing timeline of information related to one or more items. For example, after creating a timeline, such as timeline 2500, according to process 2400, a user may desire to edit the timeline and/or add a new item to the timeline. To do, so the user may implement process 2600. At 2604, the process 2600 generally begins when the user causes the electronic device to "scan" the smart tag of an item that the user desires to add to the timeline, or the user causes the electronic device to "scan" the smart tag of an item for which the user desires to edit or delete its appearance on the timeline. During the scan, the electronic device 102 obtains from the smart tag 120 the item identifier 430 associated with the item 124. The electronic device 102 may obtain additional information from the smart tag, such as instructions regarding which application to launch (e.g., could be instructions to launch web browser and go to a specified webpage or website). At 2608, the electronic device launches, open, switches to, or otherwise activates the appropriate application, or prompts the user to download the appropriate application, if the application is not already installed (see FIG. 6). As described above, the electronic device 102, upon receiving instruction code from the smart tag, automatically launches the appropriate application or sends the appropriate download request to the application download module 514 of the digital experience manager 510.

Once the application is launched on the electronic device, the application displays a menu of options to the user. At 2612, the user selects from the menu the option to edit and/or add an item to an existing timeline. FIG. 20 provides an example screenshot 2004 of a menu of options, including a "Create or edit timeline" option 2048. At decision block 2618, the application determines whether the item associated with the item identifier is already listed on the timeline. If not, the application gives the user the option to add the item to the timeline at 2622. Here, for example, the application sends the server the item identifier of the new item, and the server obtains information about the item. For example, upon receiving the item identifier from the application, the timeline module 542 of the digital experience manager 510 uses the item identifier to search the item information 560 to obtain item descriptions, images, links to webpages where the items may be purchased or where more information may be obtained, etc.

At 2626, the application gives the user the option to add or edit information presented on the timeline. In the event the user is editing an existing item, the user is given the option to add or remove information about the item. In the event the user is adding a new item, the user is given the option to select from information obtained from the item information 560 and to input user comments. At 2630, the application updates the timeline to include the new item and associated information and/or to reflect the user edits to an existing item.

Figure 28:
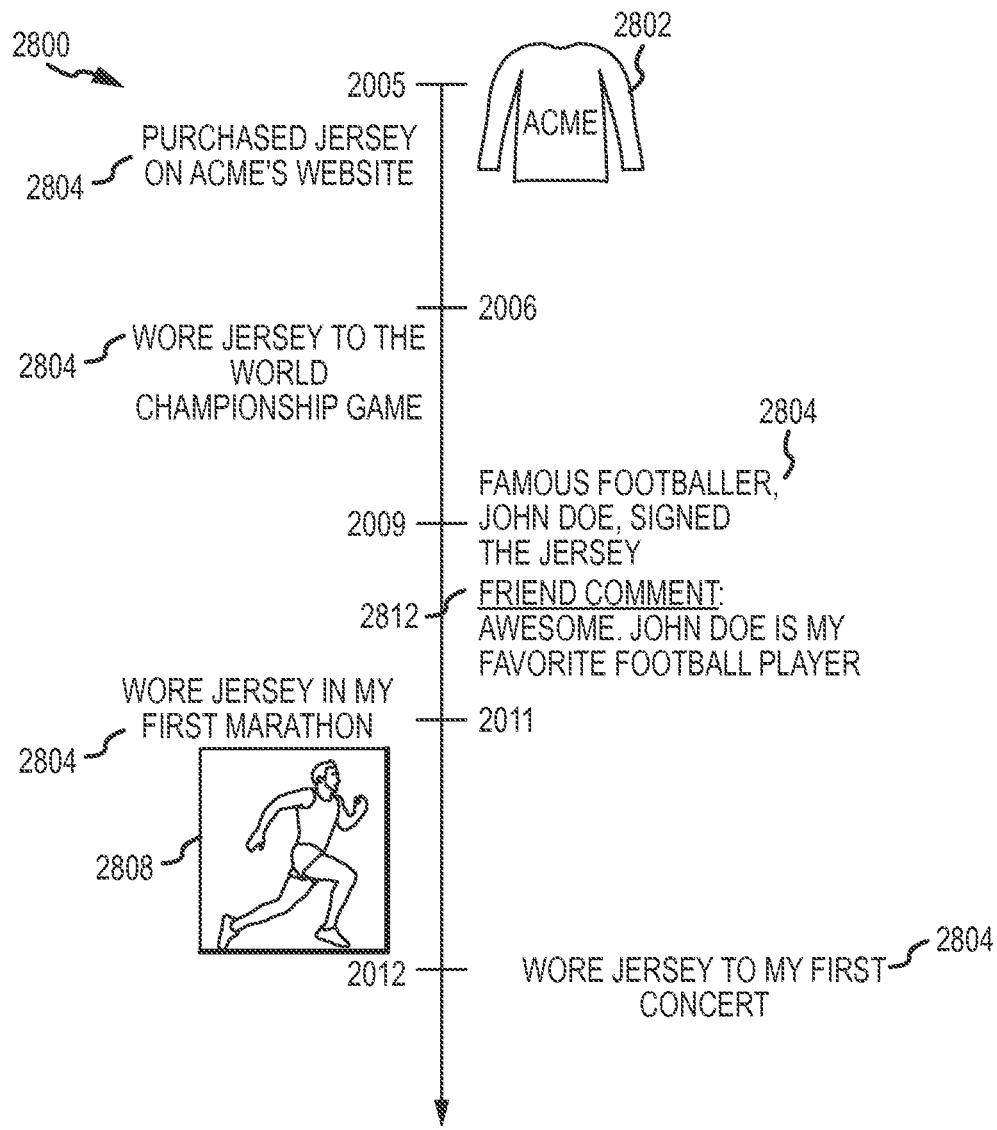
FIG. 28 is a schematic diagram of a screenshot of an example timeline of events created according to the process of FIG. 27, in accordance with at least one embodiment.

Referring to FIG. 27, a flow diagram is provided illustrating a process 2700 of creating a timeline of events associated with an item. FIG. 28 is a schematic diagram of a screenshot of an example timeline of events 2800 created according to process 2700. The illustrated timeline 2800 lists a chronology of events for a single item 2802. For each event, the timeline may include an event description 2804 that includes user notes and comments, a photograph or image 2808, and friends' notes and comments 2812. It should be appreciated that other information may be provided, such as links to additional photos or information about the event, etc.

The process 2700 generally begins at 2704 when a user launches an application on an electronic device and at 2708 selects from an application menu an option to create a timeline of events for an item. For example, to launch the application, the user may access the electronic device and select the icon associated with the item. Also for example, the user may launch the application by scanning a smart tag associated with the item for which he or she desires to create a timeline of events. Once the application launches, according to an embodiment, the user is presented with a user interface similar to screenshot 2004 of FIG. 20, and the user selects Option 2048 ("Create timeline") from the menu 2012. After selecting this option the user may then specify that he or she desires to create a time line of events (rather than a timeline of products).

At 2712, the application sends to a server a request to create a timeline, where the request includes an item identifier of the item around which the timeline is to be built, as well as a user identifier of the user. For example, the electronic device 102 sends a request, including the item identifier and the user identifier, to the timeline module 542 of the digital experience manager 510. At 2716 the server obtains events information related to the item so as to compile a list of events associated with the item. For example, the timeline module 542 uses the item and user identifiers to obtain relevant item information 560 and check-in information 576. For example, relevant item information may include description and images of the item and relevant check-in information may include the events (e.g., times and places) where the item has been checked in. After identifying the items, the timeline module 542 may use the item identifiers to search the item information 560 to obtain item descriptions, images, links to webpages where the items may be purchased or where more information may be obtained, etc.

At 2720, the server obtains information about the items from the user. For example, the timeline module may prompt the user, via the electronic device 102, to provide comments about the one or more events. As illustrated in FIG. 28, the user provides comments about the event, such as "Wore jersey in my first marathon."

At 2724, the sever generates an event timeline for the item. For example, the timeline module 542 compiles the information obtained at 2716 and 2720 into a template that results in timeline, such as timeline 2800, that lists events involving the item in chronological order and that includes event descriptions, photographs, videos and images, user notes and comments, etc. It should be appreciated that the timeline may include any other suitable information about the events. Further, it should be appreciated that the timeline does not have to be chronologically organized. For example, it could be organized by event category, event popularity, etc. The timeline could also be organized in any manner specified by the user. At 2728, the server displays the event timeline in a graphical user interface or shares the timeline with a social network, where friends may comment, such as comment 2812. For example, the timeline module 542 may transmit the timeline to the electronic device 102 for display via the display 208. Also for example, the timeline can be transferred to another device 102 by 'tapping' and sharing via NFC.

According to embodiments, timelines can be used to create additional value for item 124 prior to sale/re-sale based on item's certified "history". For example, items, such as balls and jerseys, can "visit" a team's locker room or home pitch/court/field prior to being shipped to retail or sold. This would be documented by "tapping" the item in that location and adding the location to the item's individual timeline. Customers could tap the item at retail to see a timeline before purchasing. For example, a customer could use his electronic device to tap the smart tag of an item and view the items timeline, which could indicate that the item has been to particular places and/or worn or used by particular people (e.g. famous athletes). In some examples, the timeline could indicate that a particular item was warn or used by particular people in a particular event, such as worn or used by a famous basketball player in an important basketball game. There could be a marketing call-out or visible tag telling the customer, or it could be a surprise that causes everyone to start tapping different products in search of one with a special timeline. The purchase history could also become part of the timeline so that famous owners of products can be traced and authenticated. This would require ownership credentials be registered using authenticated social networking and media accounts (e.g., Twitter®, Facebook®). Products that end up on display can then be tapped by guests to view the timeline on their electronic devices.

The outline can be a "time capsule" for an item that documents key milestones and chronological events to an item using the smart tag as the trigger. The time line can include personal achievements/records (e.g., fastest 10 k, longest run, etc.), completed race events (e.g., famous marathons, etc.), highest elevation, cumulative miles, purchase date, etc. For non-performance the timeline could include sporting events (e.g., visited famous stadium on 12/02/202 to see two famous soccer clubs compete, etc.), nightclubs (famous club in New York City, etc.). These events can be attached via tapping the items with the electronic device running a custom app. All types of media can be attached to the timeline, such as video, photos, voice, and text along with option to share via social networks.

According to embodiments, smart tags 120 can be embedded with useful information and attached to any number and variety of items, and can be available to share the embedded information electronic devices 102 presented by any user. For example, smart tags 120 can be used as trail markers. These smart tags 120 can be placed along the trail (e.g., attached to trees, posts, etc.) and include details about the trail, such as distance, altitude, historical events that occurred at or near the location, etc. The smart tags can also include mapping information that can be transmitted to and rendered by the electronic devices. For example, a user may tap one of these smart tags, and the smart tag instructs the electronic device 102 to download the trail route and/or to begin a workout along the route. In some instances, the smart tag instructs a workout application on the mobile device to download the route and start the workout. The application could enable check-in and/or sharing the route on social networks. In another example, smart tags 120 may be placed on gym equipment. The smart tags could transmit to electronic devices information, such as the name/type of the equipment and information about the user's use of the equipment. For example, the smart tag could transmit number of repetitions and/or sets, the weight or settings used, time between each repetition and/or set, and the total workout time using the equipment. Additionally, a mobile application of the electronic device could instruct the equipment regarding how much weight to load, which setting(s) to use, number of repetitions to count down, and prescribed rest times between repetitions.

Figure 29:
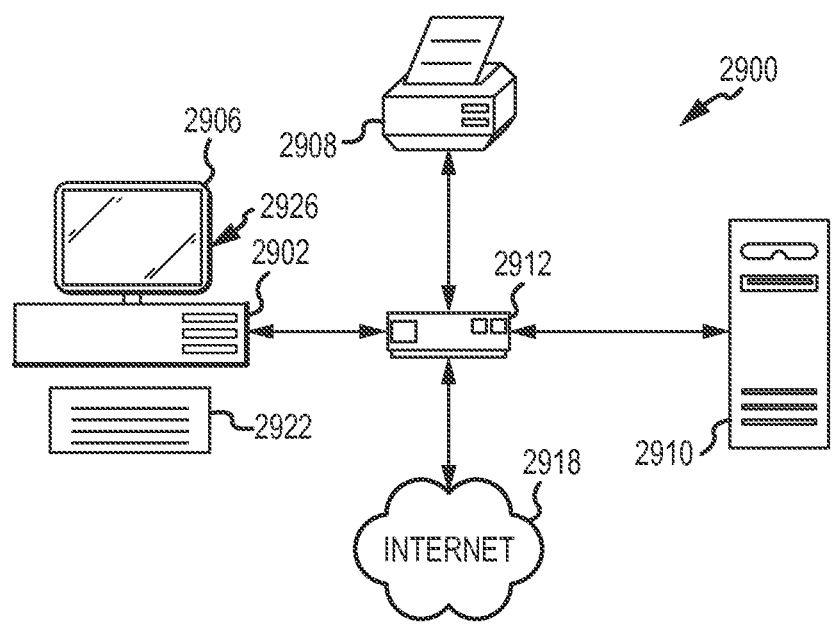
FIG. 29 is an exemplary environment in which embodiments may be implemented, in accordance with at least one embodiment.

FIG. 29 is an example environment 2900 in which embodiments may be implemented.

The environment 2900 includes a computer 2926, a network router 2912, a printer 2908, and a server 2910, interconnected by a network 2918, such as the Internet, wide area network, local area network, etc. The computer 2926 includes a monitor 2906, a processor 2902, and keyboard 2922. The computer 2926 can be, for example, a laptop computer, desktop computer, handheld computer, and electronic device, such as electronic device 102, a mainframe computer, etc. According to embodiments, users can input commands into the computer 2926 using various input devices, such as a touch screen, a mouse, the keyboard 2922, track ball, etc.

The server 2910 may, for example, be used to store additional software programs and data. In one embodiment, software implementing the systems, methods, and processes described herein can be stored on a storage medium in the server 2910. Thus, the software can be run from the storage medium in the server 2910. In another embodiment, software implementing the systems, methods, and processes described herein can be stored on a storage medium in the computer 2926. Thus, the software can be run from the storage medium in the computer system 2926. Therefore, in this embodiment, the software can be used whether or not computer 2926 is connected to network router 2912. It should be appreciated that the printer 2908 may be connected directly to computer 2926, rather than via the router 2912.

Figure 30:
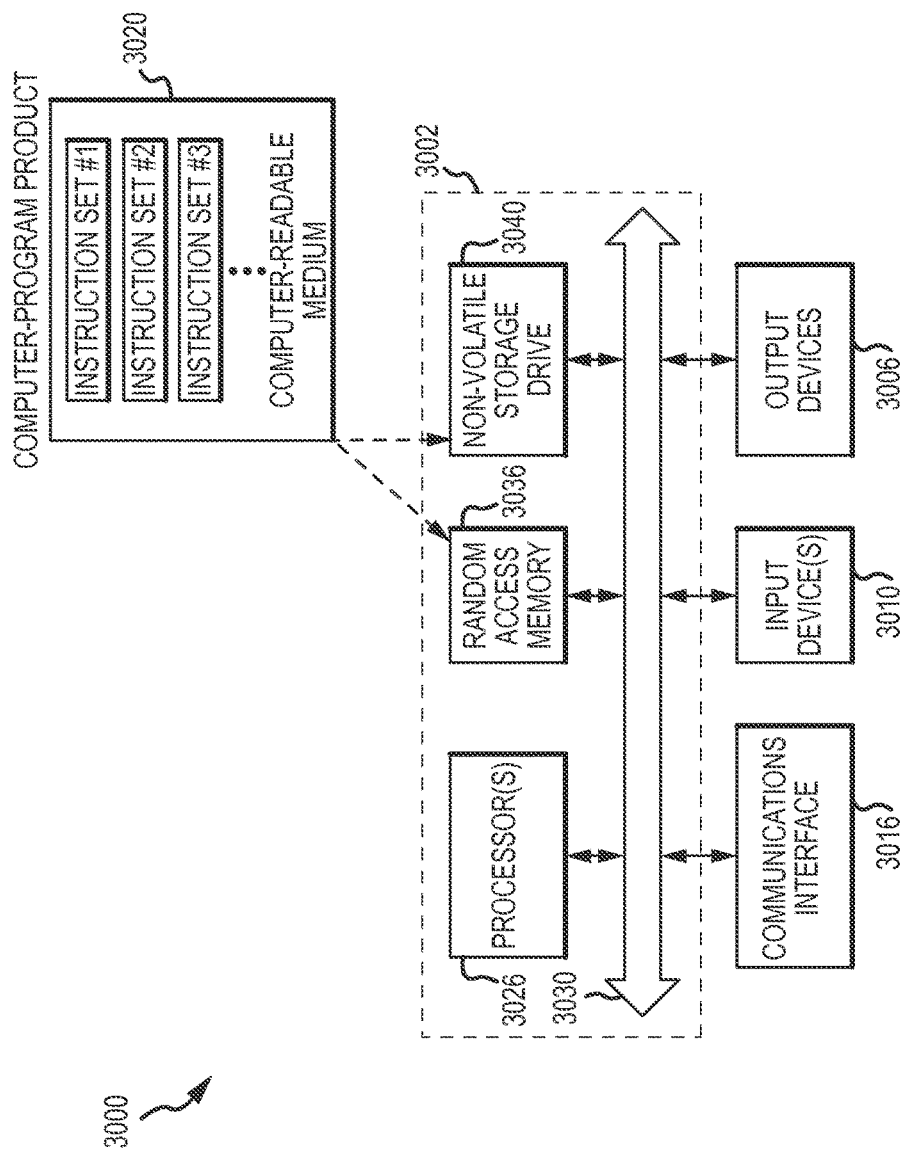
FIG. 30 illustrates a block diagram of a special-purpose computer, in accordance with at least one embodiment.

As illustrated in FIG. 30, an embodiment of a special-purpose computer system 3000 is shown. For example, the digital experience manager 510 and components thereof may be a special-purpose computer system 3000. The above methods may be implemented by computer-program products that direct a computer system to perform the actions of the above-described processes and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer 2926, it is transformed into the special-purpose computer system 3000.

Special-purpose computer system 3000 comprises a computer 3002 having connected thereto user output device(s) 3006 (e.g., monitor), user input device(s) 3010 (e.g., keyboard, mouse, track ball, touch screen), communication interface 3016, and/or a computer-program product 3020 stored in a tangible computer-readable memory. The computer-program product 3020 directs computer system 3000 to perform the above-described methods and processes. The computer 3002 may include one or more processors 3026 that communicate with a number of peripheral devices via a bus subsystem 3030. These peripheral devices may include the user output device(s) 3006, the user input device(s) 3010, the communications interface 3016, and a storage subsystem, such as random access memory (RAM) 3036 and non-volatile storage drive 3040 (e.g., disk drive, optical drive, solid state drive), which are forms of tangible computer-readable memory.

The computer-program product 3020 may be stored in the non-volatile storage drive 3040 or another computer-readable medium accessible to the computer 3002 and loaded into memory 3036. Each processor 3026 may comprise a microprocessor, such as a microprocessor from Intel® or Advanced Micro Devices, Inc.®, or the like. To support computer-program product 3005, the computer 3002 runs an operating system that handles the communications of product 3020 with the above-noted components, as well as the communications between the above-noted components in support of the computer-program product 3020. Example operating systems include Windows® or the like from Microsoft Corporation, OS X® from Apple, Solaris® from Sun Microsystems, LINUX, UNIX, and the like.

User input devices 3010 include all possible types of devices and mechanisms to input information to the computer 3002. These may include a keyboard, a keypad, a mouse, a scanner, a digital drawing pad, a touch screen incorporated into the display, audio input devices such as voice recognition systems, microphones. The user input devices 3010 typically allow a user to select objects, icons, text and the like that appear on a monitor via a command such as a click of a button or the like. The user output devices 3030 include all possible types of devices and mechanisms to output information from computer 2902. These may include a display, a monitor, printers, non-visual displays such as audio output devices, etc.

The communications interface 3016 provides an interface to other communication networks and devices and may serve as an interface to receive data from and transmit data to other systems, wide area networks (WANs) and/or the Internet. Embodiments of communications interface 3016 include an Ethernet card, a modem (telephone, satellite, cable, ISDN), a (asynchronous) digital subscriber line (DSL) unit, a FireWire® interface, a USB® interface, a wireless network adapter, and the like. For example, communications interface 3016 may be coupled to a computer network, to a FireWire® bus, or the like. In other embodiments, the communications interface 3016 may be physically integrated on a motherboard of the computer 3002, and/or may be a software program, or the like.

The memory 3036 and non-volatile storage drive 303040 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, barcodes, semiconductor memories such as flash memories, read-only-memories (ROMs), battery-backed volatile memories, networked storage devices, and the like. The memory 3036 and the non-volatile storage drive 3040 may be configured to store the basic programming and data constructs that provide the functionality of various embodiments of the present invention, as described above.

Software instruction sets that provide the functionality of the present invention may be stored in the memory 3036 and non-volatile storage drive 3040. These instruction sets or code may be executed by the processor(s) 3026. The memory 3036 and the non-volatile storage drive 3040 may also provide a repository to store data and data structures used in accordance with the present invention. The memory 3036 and the non-volatile storage drive 3040 may include a number of memories including a main RAM to store of instructions and data during program execution and a ROM in which fixed instructions are stored. The memory 3036 and the non-volatile storage drive 3040 may include a file storage subsystem providing persistent (non-volatile) storage of program and/or data files. The memory 3036 and the non-volatile storage drive 3040 may also include removable storage systems, such as removable flash memory.

The bus subsystem 3030 provides a mechanism to allow the various components and subsystems of computer 3002 to communicate with each other as intended. Although bus subsystem 3030 is shown schematically as a single bus, alternative embodiments of the bus subsystem may utilize multiple busses or communication paths within the computer 3002.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including ROM, RAM, magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

What is claimed is:

1. A system for delivering digital content related to an article of apparel, the system comprising:
    an article of apparel;
    an NFC chip affixed to the article of apparel, wherein the NFC chip stores identifying information of the article of apparel;
    a remote computing device storing digital content related to the article of apparel;
    an application configured to be executed by an NFC-enabled mobile computing device, wherein the application, when executed, causes the NFC-enabled mobile computing device to:
        receive, from the NFC chip embedded in the apparel tag, the identifying information of the article of apparel;

request, from the remote computing device, first digital content related to the article of apparel using the identifying information of the article of apparel;

receive, from the remote computing device, the first digital content related to the article of apparel;

display, on a display of the NFC-enabled mobile computing device, the first digital content related to the article of apparel;

request, from the remote computing device, second digital content related to the article of apparel;

receive, from the remote computing device, the second digital content related to the article of apparel; and display, on the display of the NFC-enabled mobile computing device, the second digital content related to the article of apparel, wherein the first digital content and the second digital content are different.

2. The system of claim 1, wherein the article of apparel is a shoe.

3. The system of claim 2, wherein the NFC chip is embedded in the shoe.

4. The system of claim 1, wherein the article of apparel is an athletic shirt or a jersey.

5. The system of claim 1, further comprising an apparel tag affixed to the article of apparel, wherein the NFC chip is embedded in the apparel tag.

6. The system of claim 5, wherein the article of apparel is an athletic shirt or a jersey.

7. The system of claim 5, wherein the NFC chip is stitched into the athletic shirt or the jersey.

8. The system of claim 1, wherein at least one of the first digital content and the second digital content includes a list of events related to the article of apparel.

9. A system for delivering digital content related to an article of apparel, the system comprising:

an item;

a smart tag associated with the item, wherein the smart tag stores identifying information of the item;

a remote computing device storing digital content related to the item;

an application configured to be executed by a mobile computing device, wherein the application, when executed, causes the mobile computing device to:

receive, from the smart tag, the identifying information of the item;

request, from the remote computing device, first digital content related to the item using the identifying information of the item;

receive, from the remote computing device, the first digital content related to the item;

display, on a display of the mobile computing device, the first digital content related to the item;

request, from the remote computing device, second digital content related to the item;

receive, from the remote computing device, the second digital content related to the item; and display, on the display of the NFC-enabled mobile computing device, the second digital content related to the item, wherein the first digital content and the second digital content are different.

10. The system of claim 9, wherein the smart tag is an NFC chip.

11. The system of claim 9, wherein the smart tag is an RFID chip.

12. The system of claim 9, wherein the smart tag is disposed in the item.

13. The system of claim 9, wherein the item is an athletic shirt or a jersey.

14. The system of claim 9, wherein the item is a shoe.

15. The system of claim 9, wherein at least one of the first digital content and the second digital content includes a list of events related to the item.

16. A system for delivering digital content related to an article of apparel, the system comprising:

an item comprising a smart tag, wherein smart tag stores identifying information of the item; and an application configured to be executed by a mobile computing device, wherein the application, when executed, causes the mobile computing device to:

receive, from the smart tag, the identifying information of the item;

request, from a remote computing device, first digital content related to the item using the identifying information of the item;

receive, from a remote computing device, the first digital content related to the item;

display, on a display of the mobile computing device, the first digital content related to the item;

request, from the remote computing device, second digital content related to the item;

receive, from the remote computing device, the second digital content related to the item; and display, on the display of the NFC-enabled mobile computing device, the second digital content related to the item, wherein the first digital content and the second digital content are different.

17. The system of claim 16, wherein the smart tag is an NFC chip.

18. The system of claim 16, wherein the smart tag is an RFID chip.

19. The system of claim 16, wherein the smart tag is disposed in the item.

20. The system of claim 16, wherein the item is an athletic shirt or a jersey.

21. The system of claim 16, wherein the item is a shoe.

22. The system of claim 16, further comprising an tag affixed to the item, wherein the smart tag is embedded in the tag.

23. The system of claim 16, wherein at least one of the first digital content and the second digital content includes a list of events related to the item.

* * * * *